(12) United States Patent
Willis

(10) Patent No.: US 9,950,564 B2
(45) Date of Patent: Apr. 24, 2018

(54) ARTICULATING CARRIAGE

(76) Inventor: Douglas G. Willis, Fresno, CA (US)

( * ) Notice: Subject to any disclaimer, the term of this patent is extended or adjusted under 35 U.S.C. 154(b) by 59 days.

(21) Appl. No.: 12/754,593

(22) Filed: Apr. 5, 2010

(65) Prior Publication Data

US 2017/0361651 A1   Dec. 21, 2017

(51) Int. Cl.
B60B 33/00   (2006.01)

(52) U.S. Cl.
CPC ...... B60B 33/0042 (2013.01); B60B 33/0015 (2013.01); B60B 2900/551 (2013.01)

(58) Field of Classification Search
CPC . Y10T 16/191; Y10T 16/1853; Y10T 16/218; Y10T 16/209; B60B 33/0042; B60B 33/0015; B60B 33/021; B60B 33/0078; B60B 33/0089; B60B 33/045; B60B 33/04; B60B 33/06
See application file for complete search history.

(56) References Cited

U.S. PATENT DOCUMENTS

| | | | | |
|---|---|---|---|---|
| 1,666,139 | A | * | 4/1928 | Johnson ................ B62B 5/0083 16/48 |
| 3,404,425 | A | * | 10/1968 | Wilder ................... A47B 81/06 16/30 |
| 3,411,798 | A | * | 11/1968 | Capadalis ............... B62B 1/002 16/30 |
| 3,433,500 | A | * | 3/1969 | Christensen ............ B60B 33/00 16/47 |
| 3,473,818 | A | * | 10/1969 | Meredith ................ B62B 19/02 280/13 |
| 3,696,877 | A | * | 10/1972 | Dessureault ........... B62M 27/02 180/184 |
| 5,344,169 | A | * | 9/1994 | Pryor .................... A61G 7/0503 248/129 |
| 5,507,069 | A | * | 4/1996 | Willis ..................... B60B 33/00 16/18 R |
| 5,903,956 | A | * | 5/1999 | Theising ................ B60B 33/06 16/19 |
| 5,924,168 | A | * | 7/1999 | Webb et al. ......... A47B 47/021 16/30 |

(Continued)

FOREIGN PATENT DOCUMENTS

EP           0052528 A1 * 5/1982 ........... B60B 33/021

*Primary Examiner* — Chuck Mah
(74) *Attorney, Agent, or Firm* — Richard A. Ryan

(57) ABSTRACT

An articulating carriage for moving an object across a surface having a non-planar obstruction to allow movement of the object over the obstruction. The articulating carriage has a walking beam assembly that pivotally supports a pedestal to dispose a support surface thereof above the walking beam assembly. The walking beam assembly has a base plate, wheeled casters and a pair of spaced apart hangers having articulation openings. The walking beam pivots relative to the pedestal. In one embodiment, the pedestal is pivotally mounted on the walking beam assembly. In another embodiment, a pair of walking beam assemblies are connected with a crosstube that pivotally supports the pedestal. In another embodiment, a major crosstube assembly connects a pair of crosstubes to define a carriage having four walking beams. In yet another embodiment, a compound crosstube assembly connects pairs of major crosstube assemblies to define a carriage having eight walking beams.

20 Claims, 20 Drawing Sheets

(56) References Cited

U.S. PATENT DOCUMENTS

| | | | | |
|---|---|---|---|---|
| 6,183,405 B1* | 2/2001 | Schurig | ............... | B60B 33/0039 16/18 B |
| 7,146,683 B1* | 12/2006 | Willis | ................. | B60B 33/0028 16/18 R |
| 7,328,907 B1* | 2/2008 | Bileth | ..................... | A47F 5/137 280/79.11 |
| 7,500,285 B2* | 3/2009 | Willis | ................. | B60B 33/0028 16/18 R |
| 7,708,516 B1* | 5/2010 | Snook | ..................... | B66F 7/065 187/211 |
| 8,650,710 B1* | 2/2014 | Waggener | ............. | B60B 33/006 16/18 B |
| 8,881,366 B2* | 11/2014 | Bornhorst | ........... | B66F 9/07586 29/525.02 |
| 2002/0088083 A1* | 7/2002 | Takizawa | ................ | B25J 5/007 16/45 |
| 2006/0196006 A1* | 9/2006 | Willis | ................. | B60B 33/0007 16/47 |
| 2017/0166006 A1* | 6/2017 | Willis | .................. | B60B 35/007 |

\* cited by examiner

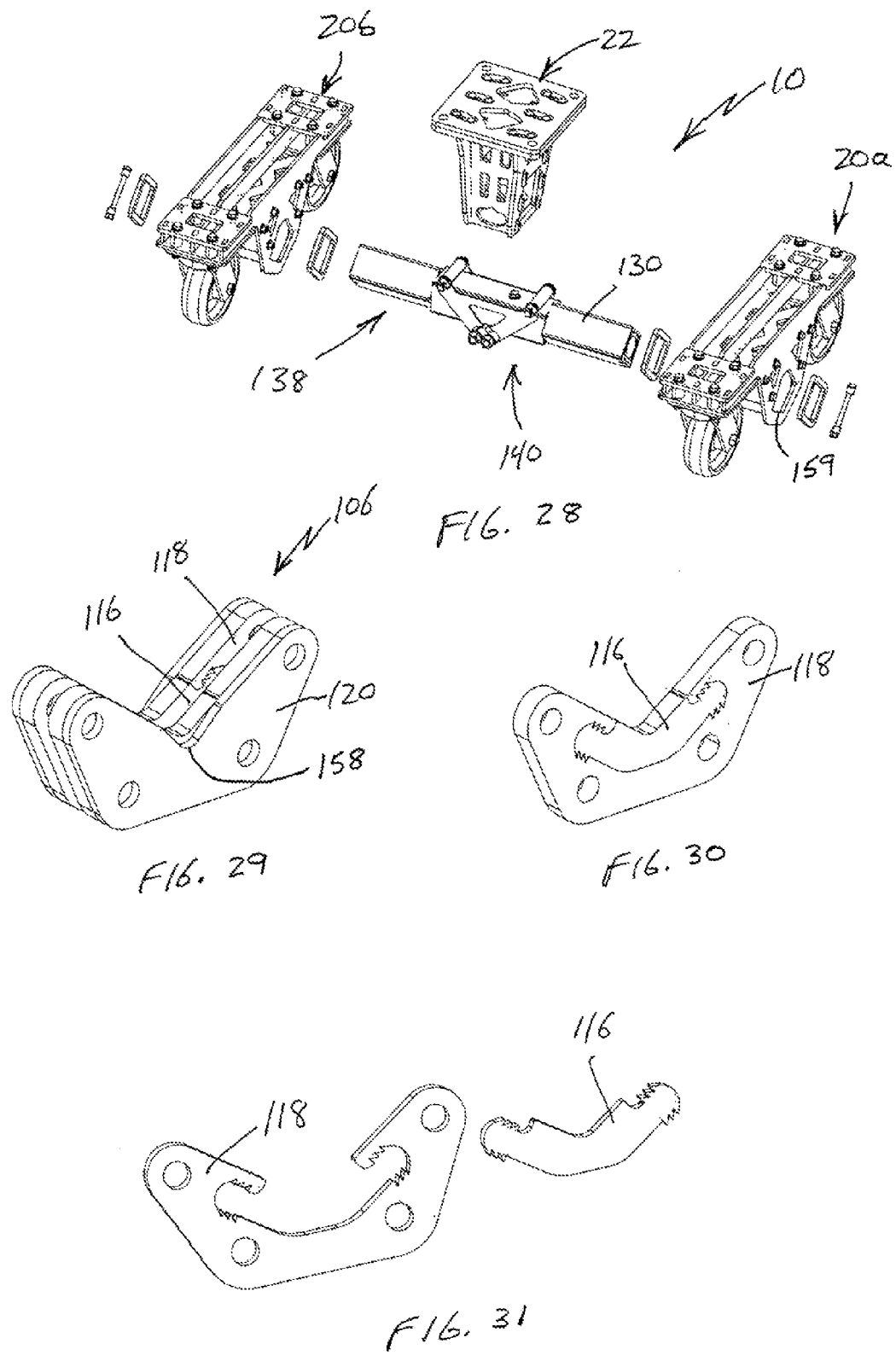

ARTICULATING CARRIAGE

REFERENCE TO RELATED APPLICATIONS

None.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to carriages, casters and like apparatuses that are utilized to moveably support a load across a surface. In particular, the present invention relates to carriages that moveably support a load across an uneven or irregular surface. Even more particularly this invention relates to such carriages that may be joined together to carry large, heavy loads across an uneven or irregular surface.

B. Background

Casters and carriage assemblies, typically comprising one or more casters, are generally well known and commonly utilized to assist in moving an object from one location to another across a surface. A conventional carriage assembly is attached to, integral with or otherwise configured to support a frame or the like having a support surface on which the object rests or is attached in a manner that allows the user to move the object with much less effort than would otherwise be required. Such carriage assemblies are utilized in numerous types of industry, in the home, in the medical field and, generally, anywhere it is either necessary or desirable to efficiently and safely move an object across a surface. For instance, airplane, automobile and other vehicle factories use carriage assemblies to move engines, frames, transmissions and other components from one part of the factory to another.

Although conventional carriage assemblies, as well as individual casters, tend to function well on smooth surfaces, they generally do not function very well on surfaces that are uneven and/or irregular. Even surfaces that appear to be planar will often, if not usually, have areas where the surface is not planar. For instance, many concrete or other hard, relatively smooth surfaces have one or more expansion joints, door jambs and tracks, markings and the like that must be passed over or crossed to transfer the object, moveably supported by the carriage assembly or caster, across the surface. In addition, conventional carriage assemblies and casters also tend to not function well on surfaces that have small obstructions, such as rocks, screws, bolts and such, on the surface in the path where a wheel of the carriage assembly or caster will traverse. Such objects are commonly found on factory and other floors. As well known, when a wheel of a carriage assembly or caster attempts to pass over an uneven or irregular area of the surface or a small object on the surface, the wheel tends to have difficulty. The difficulty of passing across such an area or over such obstructions is significantly compounded when the load is heavy. Such difficulty can substantially decrease the efficient operation of moving the object.

In addition to the loss of efficiency, the problems associated with moving a heavy object across a surface on a frame or the like supported above the surface by a conventional carriage assembly or caster include the risk of tipping due to the carriages/casters being inherently unstable on uneven and irregular surfaces and surfaces having small obstructions. The risk of tipping is substantially increased when changing directions and under other circumstances, including when the carriage/caster encounters something on the surface that tends to restrict travel in the selected direction. Generally, the instability results from the carriage/caster having a support post that is offset a distance away from the wheel axle. The load supported by the carriage/caster tends to bear down through the support post, which produces a tipping moment relative to the wheel axle. In addition, the angled vector of the weight of the object being moved tends to be higher than the wheel axle and, therefore, will drive the wheel down against the uneven or irregular surface or the obstruction on the surface, making it more difficult to traverse that area or obstruction.

Various carriage assemblies and casters have been devised which are better adapted to move an object, particularly a heavy object, across an uneven or irregular surface and over obstructions on the surface. One such prior art caster is set forth in U.S. Pat. No. 5,507,069, which issued to one of the inventors of the present invention. The above patent describes an articulated caster having a base assembly with three or more wheels attached thereto and extending radially from the center of the base and a pivot arm having a housing at a lower end that is received in a recessed area of the base. The upper end of the pivot arm connects to the apparatus using the caster. The pivot housing includes a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. No. 7,146,683, U.S. Pat. No. 7,500,285 and U.S. Pat. No. 7,506,405, which also issued to one of the inventors of the present invention, describes an articulated caster comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, is configured to force a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages.

One known disadvantage of prior art carriage assemblies and casters, including those described above, is that the components thereof require varying degrees of machining, welding and/or break bending to configure the carriage/caster for use with a frame to move an object across a surface. As is well known, such operations increase the cost of assembling the carriage/caster, both in materials and in labor, and result in structural weak points that can fail or otherwise reduce the useful life of the carriage/caster. In certain circumstances, the impact of these operations can significantly impact the cost and life of the carriage/caster. In addition to increasing the initial cost, the manner in which prior art carriages and casters are configured makes it difficult and relatively expensive to repair any parts that fail or replace any parts that have worn.

While the above patents represent a substantial improvement over prior art casters, there is a need for an improved articulating carriage for use to move objects across an uneven or irregular surface and across a surface having small obstructions in the path of the carriage. Specifically, what is needed is an articulating carriage that is more effective and efficient at moving an object, particularly heavy and/or large objects, across a surface which is uneven or irregular or which contains obstructions that could impede the movement of the carriage. The preferred carriage should be configured such that it drives the wheels over any uneven or irregular areas and any obstructions, it is stable while going over such areas or obstructions and it is relatively close to the surface for ease of loading and unloading the object from a frame having the improved carriage. Preferably, the carriage should be configured such that it can be assembled without machining, welding or break bending of any components to reduce the cost of such assembly and the need for expensive skilled labor. The preferred carriage should be configured to be joined with like carriages so as to provide a carriage system that can efficiently and safely move large and/or heavy objects across a surface.

SUMMARY OF THE INVENTION

The articulating carriage of the present invention provides the benefits and solves the problems disclosed above. That is to say, the present invention discloses an articulating carriage which effectively, efficiently and safely moves an object across a surface, including areas of the surface that are uneven or irregular or which have small obstructions thereon, by not being impeded by such areas or obstructions and being stable during use. The articulating carriage of the present invention has a low driving moment such that when a wheel hits an uneven or irregular area or an obstruction, the wheel is driven up over the area or obstruction so as not to impede movement of the object being moved by the articulating carriage. The articulating carriage of the present invention places the frame or other support to which it is attached and on which the object is carried close to the ground for ease of loading and unloading the object. In the preferred embodiment of the present invention, the articulating carriage can be assembled without requiring the end user to machine, weld or break bend any components of the carriage, thereby reducing the cost of such assembly and the need for expensive skilled labor. The articulating carriage of the present invention can be joined with like carriages to provide a carriage system that efficiently and safely moves large and/or heavy objects across a surface, including surfaces that are uneven or irregular or which have small obstructions thereon.

A preferred embodiment of the articulating carriage of the present invention generally comprises a walking beam assembly that moves across a surface, a pedestal supported above the surface by the walking beam assembly and attached to the object, directly or indirectly, to be moved across the surface and a pivoting mechanism that allows the walking beam assembly to pivot relative to the pedestal so the articulating carriage may move over planar and non-planar areas, including obstructions, on the surface without stopping and/or potentially dropping the object onto the surface. The walking beam assembly has a base plate, a first caster assembly at its first end, a second caster assembly at its second end, a first hanger supported by the base plate and a second hanger supported by the base plate in spaced apart relation to the first hanger. In a preferred embodiment of the present invention, the hangers are on opposite sides of the elongated base plate with an upper end engagedly supported by the base plate and a lower end extending below the base plate. Each of the caster assemblies have a wheel that is configured to rotatably engage the surface and support the base plate above the surface. Each of the hangers have one or more articulation openings therein that are disposed in corresponding relation to each other, on opposite sides of the base plate, and are positioned below the base plate. In a preferred configuration, the pedestal has a generally vertically disposed first support plate, a generally vertically disposed second support plate, which is in spaced apart relation to the first support plate, and a generally horizontally disposed mounting plate that interconnects the two support plates so as to dispose a support surface above the base plate. The support surface supports, directly or indirectly, the object above the walking beam assembly. The pivoting means, which interconnects the walking beam assembly and pedestal, comprises a bushing assembly positioned at a lower end of each of the first hanger and the second hanger below the base plate, a first fulcrum plate at the first support plate of the pedestal, a second fulcrum plate at the second support plate of the pedestal, a contact surface on each of the first and second fulcrum plates and a pivot member that interconnects the first and second fulcrum plates through opposing articulation openings on the first and second hangers. In a preferred embodiment, there is a pair of fulcrum plates at each of the first and second support plates. The contact surfaces are disposed in pivoting relation to the bushing assemblies on the hangers such that the contact surfaces contact the bushing assemblies below a plane which is taken through the axis of the wheels of the walking beam assembly to provide a low moment of inertia and low angle of drive to assist in driving the articulating carriage over any non-planar areas of the surface. The pivot member is configured to move within the opposing articulation openings in response to pivoting of the walking beam assembly.

In a preferred embodiment of the present invention, the wheels of the first and second caster assemblies, located at the front and back ends of the walking beam assemblies, are linearly aligned with each other. In the preferred configuration, the articulating carriage is configured to be assembled without requiring the manufacturer, assembler or end user to machine, weld or break bend any components of the carriage. To accomplish this and to add strength to the walking beam assembly, the preferred embodiment of the articulating carriage utilizes a securing mechanism that comprises a clamping plate at each of the first and second ends of the walking beam assembly to clamp outwardly extending tangs, which extend in opposite directions at the upper end of the hangers, to the base plate. Preferably, each of the outwardly extending tangs comprises one or more upwardly extending tabs configured to engage one or more cooperatively configured tab receiving openings in the clamping plate and comprises one or more downwardly extending tabs configured to engage one or more cooperatively configured tab receiving openings in the base plate. For added support, the preferred embodiment also includes at least one support rib disposed between the first hanger and the second hanger, with the support rib being engagedly supported by the base plate and clamped by the clamping plate. In the preferred embodiment, each of the pedestal support plates have one or more upwardly extending tabs that engage cooperatively configured tab receiving openings in the mounting plate. A pivot limiting means interconnects the walking beam assembly and the pedestal to limit the pivotal movement of the walking beam assembly. Preferably, the pivot limiting means comprises an upwardly extending tang on each of the first fulcrum plate and the second fulcrum plate and a pair of cooperatively positioned notched sections in the base plate, with one of the upwardly extending tangs received within one of the notched sections to limit pivotal movement of the walking beam assembly relative to the pedestal. In another embodiment, the pivot limiting means comprises the forward and rearward edges of the articulation opening. In yet another embodiment, the pivot member is a tubular-shaped crosstube, with the articulation opening and the crosstube being cooperatively configured to receive the crosstube through the articulation opening and to allow the desired pivotal movement of the walking beam assembly. Preferably, each of the bushing assemblies has a replaceable bushing that is removably received in a bushing holder.

The articulating carriage of the present invention provides a high temperature tolerance for autoclave and like operations, such as are commonly utilized in the aerospace industry. In the preferred embodiment, the articulating carriage is tolerant of outdoor, dirty and/or corrosive environments. As such, the articulating carriage of the present invention is particularly useful for custom, temporary and/or military deployment applications, such as those where the carriage system may be left behind or disposed of at forward locations after a mission is accomplished rather than returned for further use. These and other benefits of the present invention will be readily understood and appreciated by those skilled in the art.

It is therefore the primary objective of the present invention to provide an improved articulating carriage that provides the advantages discussed above and overcomes the disadvantages and limitations which are associated with presently available carriages and casters.

It is also an important objective of the present invention to provide an articulating carriage that effectively, efficiently and safely moves an object across a surface, including areas of the surface that are uneven or irregular or which have small obstructions thereon.

It is also an important objective of the present invention to provide an articulating carriage that is stable even when moving large or heavy objects and when changing direction.

It is also an important objective of the present invention to provide an articulating carriage that has a low driving moment to drive a wheel over an uneven or irregular area of a surface or a small obstruction on the surface in order to not impede movement of the object being moved.

It is also an important objective of the present invention to provide an improved articulating carriage that can be assembled by the end user without the need to machine, weld or break bend any components of the carriage so as to reduce the cost of such assembly and the need for highly skilled labor.

It is also an important objective of the present invention to provide an improved articulating carriage that generally comprises a walking beam having two wheels, a pedestal that attaches to a frame for carrying an object across a surface and a pedestal connecting mechanism that connects the pedestal to a fulcrum on the walking beam in a manner that allows articulation of the carriage so as to facilitate the carriage moving the object across areas of the surface that are uneven or irregular or which have small obstructions thereon.

Another important objective of the present invention is to provide an improved articulating carriage that can be joined with like carriages to provide a carriage system which efficiently and safely moves large and/or heavy objects across a surface, including surfaces that are uneven or irregular or which have small obstructions thereon.

Yet another objective of the present invention to provide an improved articulating carriage that is relatively inexpensive to manufacture and easy to use for moving objects across a surface.

The above and other objectives of the present invention will become readily apparent and are explained in greater detail by reference to the attached figures and the description of the preferred embodiment which follows. As forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention:

FIG. 28 is a top perspective view of an alternative embodiment of the articulating carriage of the present invention;

FIG. 29 is a side perspective view of an alternative bushing assembly for use with the articulating carriage of the present invention;

FIG. 30 is a side perspective view of the bushing holder of the bushing assembly of FIG. 29 with the bushing disposed therein;

FIG. 31 is a side view of the bushing and bushing holder of FIG. 30 with the bushing removed from the bushing holder;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed description and drawings set forth and illustrate one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the present invention. For instance, although the various figures and the description provided herein are directed to certain configurations of the articulating carriage and certain relationships between the components thereof, those skilled in the art will readily understand that this is set forth merely for purposes of simplifying the present disclosure and that the present invention is not so limited.

Figure 34:
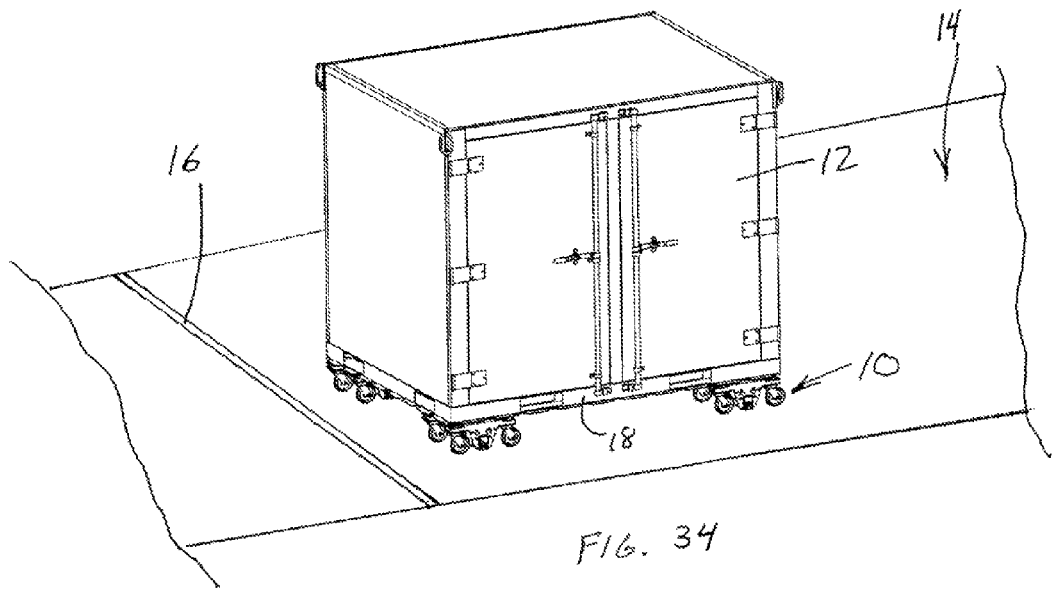
FIG. 34 shows a container supported by a frame being moved over a surface having a non-planar area by a plurality of articulating carriages of the present invention.
Figure 35:
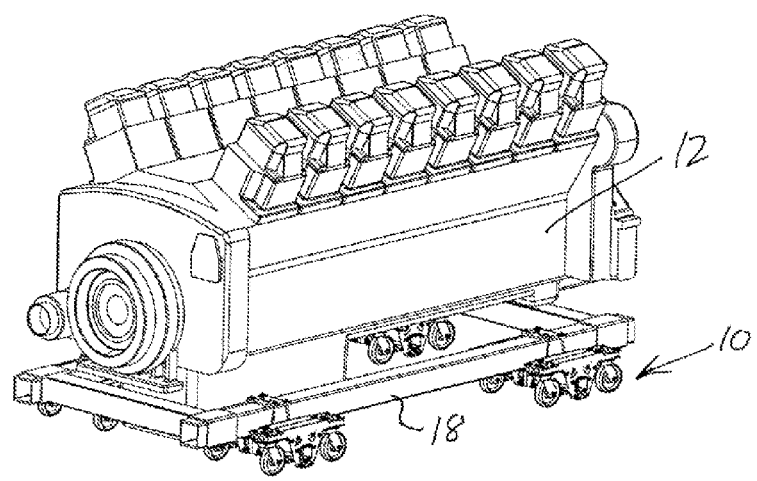
FIG. 35 shows an engine supported by a frame being moved by a plurality of articulating carriages of the present invention using the saddle mounting system of FIG. 32.

An articulating carriage that is manufactured out of the components and configured pursuant to various preferred embodiments of the present invention is shown generally as 10 in the figures. As shown in FIGS. 34 and 35, the components of which are explained in more detail below, articulating carriage 10 of the present invention can be utilized to move an object 12, such as the container in FIG. 34 or the engine in FIG. 35, across a surface 14, such as a floor or the like, that may have an uneven or irregular area or an obstruction, which are collectively referred to herein as a non-planar area 16. Typically, the object 12 will rest on or be attached to a support base 18, such as a frame or the like, that is supported above and usually attached to the articulating carriage 10 to prevent the articulating carriage from moving relative to (i.e., separating from) the support base 18. As set forth above conventional carriages and casters have problems moving across a non-planar area 16, particularly when the object 12 is large and/or heavy, and are subject to tilting due to being generally unstable. The articulating carriage 10 of the present invention solves these problems.

As exemplified by the embodiment shown in FIGS. 1 through 5C, articulating carriage 10 of the present invention generally comprises a walking beam assembly 20, a pedestal 22 and a pivoting means 24 for pivoting the walking beam assembly 20 relative to the pedestal when a non-planar area 16 is encountered by the articulating carriage 10 as object 12 is moved across the surface 14. The walking beam assembly 20 operatively supports the pedestal 22 and the other components above the surface 14 as the articulating carriage 10 moves across the surface 14. In a preferred embodiment, pedestal 22 attaches to the support base 18 to moveably support the object 12 as it moves across the surface. The pivoting means 24 allows the walking beam assembly 20 to pivot when certain components thereof encounter the non-planar area 16 in a manner that allows the user to continue moving the object 12 across the surface 14 while maintaining the stability thereof to prevent any tipping or other negative, and potentially serious, occurrences.

Several different embodiments of the articulating carriage 10 of the present invention are shown in the various figures and set forth below. In the embodiment shown in FIGS. 1 through 11, the pedestal 22 is disposed over and around the walking beam assembly 20 such that the weight of the object 12 is directed downward onto the walking beam assembly 20. In the embodiments of FIGS. 12 through 41, the pedestal 22 is disposed laterally of the walking beam assembly 20 and divided among a plurality of such walking beam assemblies 20.

Figure 1:
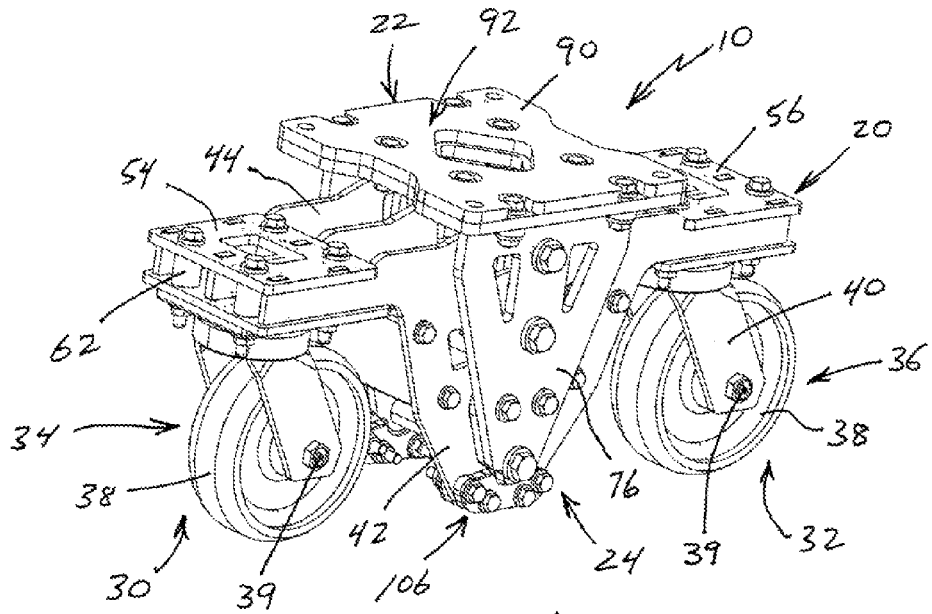
FIG. 1 is a side perspective view of an articulating carriage configured according to the principles and concepts of one of the preferred embodiments of the present invention showing the pedestal disposed at the walking beam assembly.
Figure 2:
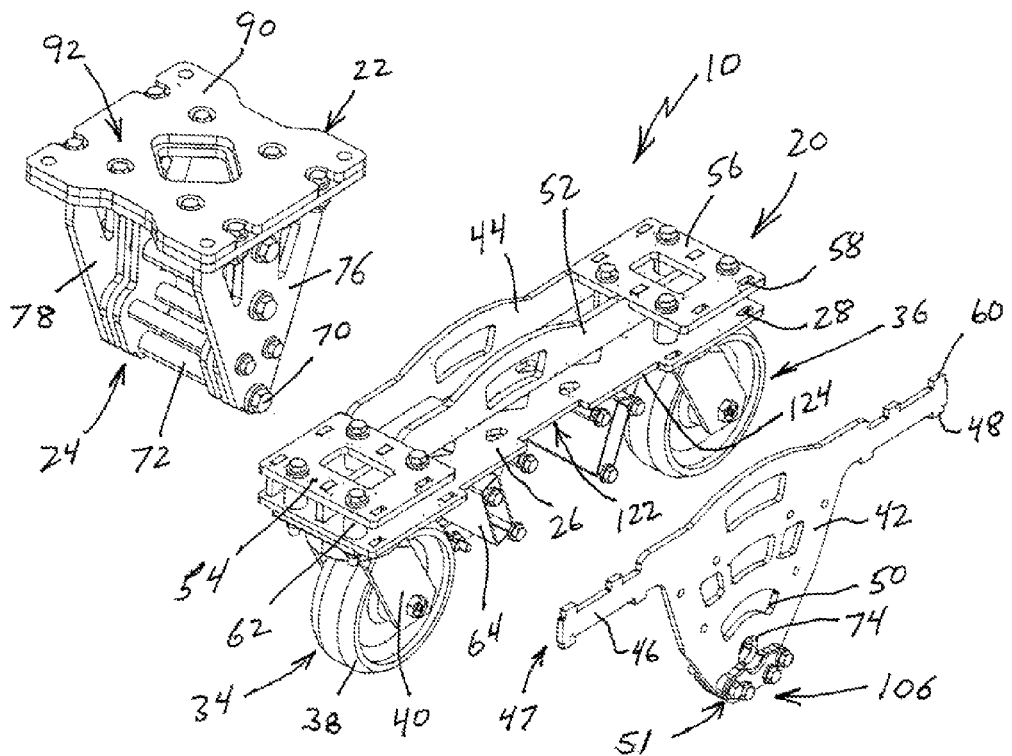
FIG. 2 is a partially exploded side perspective view of the articulating carriage of FIG. 1.

As shown with regard to the embodiment of FIGS. 1 through 5C, the walking beam assembly 20 of articulating carriage 10 comprises a base plate 26 having a plurality of tab receiving openings 28 that, in a preferred embodiment, are disposed towards each of the first or leading end 30 and the second or trailing end 32 of the walking beam assembly 20. The base plate 26 interconnects a first caster assembly 34 at the first end 30 of the walking beam assembly 20 and a second caster assembly 36 at the second end 32 of the walking beam assembly 20. Each of the first 34 and second 36 caster assemblies comprise at least one wheel 38, a wheel bracket 40 and an axle connected to wheel bracket 40 around which the wheel 38 rolls as the articulating carriage 10 moves across the surface 14. In the preferred embodiment, the wheels 38 utilized with the articulating carriage 10 are selected based on characteristics that are suitable for the intended use of articulating carriage 10. For instance, wheels 38 should be able to withstand heavy loading and move across surface 14 without damaging or marking the surface 14 (such as a floor). The wheels 38 should also have a low rolling resistance and a sufficiently high temperature tolerance. Preferably, the wheels 38 are relatively inexpensive. Nylon/fiberglass wheels 38 generally meet the desired characteristics and are utilized with a preferred embodiment of the articulating carriage 10. Other materials may also be found to be suitable for wheels 38. The wheel brackets 40 can be of the type that have a rigid, fixed position aligned with base plate 26 or can be of the type that swivel relative to the base plate 26, as well known in the art and shown with regard to the embodiment shown in FIG. 23. In the preferred embodiment, the base plate 26 is elongated and the wheel 38 of first caster assembly 34 is generally linearly disposed relative to the wheel 38 of second caster assembly 36, as shown in FIGS. 1 and 2.

Figure 5A:
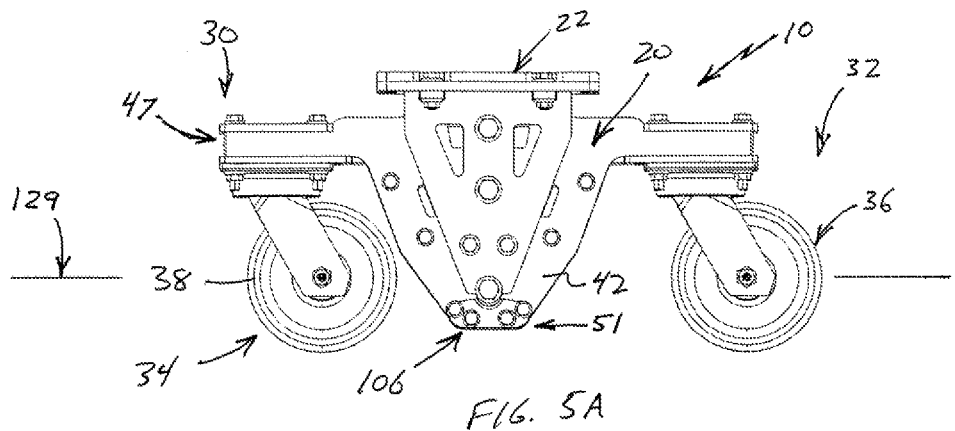
FIG. 5A through 5C are side views of the articulating carriage of FIG. 1 shown moving on a flat surface and pivoting in response to a non-planar area of the flat surface.

The walking beam assembly 20 also has a first hanger 42 and a second hanger 44 positioned at opposite sides of the base plate 26. In one embodiment, the hangers 42/44 are fixedly secured to base plate 26, such as be welding, adhesives or the like, or are integral with base plate 26. In the preferred embodiment, however, the hangers 42/44 are engagedly supported by base plate 26. To accomplish this, each of the hangers 42/44 have outwardly extending tangs 46 at the upper ends 47 thereof that extend towards and are supported by the first end 30 and second end 32 of the walking beam assembly 20, as best shown in FIGS. 2 and 5A. A plurality of downwardly extending tabs 48 on the tangs 46 are received into the tab receiving openings 28 of the base plate 26 to assist in forming the walking beam assembly 20. As set forth in more detail below, each of the hangers 42/44 have one or more articulation openings 50, which are disposed towards the lower end 51 of each of the hangers 42/44 below the base plate 26 (as best shown in FIGS. 2 and 5A), that are configured to facilitate the pivoting movement of the walking beam assembly 20 relative to the pedestal 22. If desired, the walking beam assembly 20 can also comprise one or more support ribs 52 disposed between the first 42 and second 44 hangers, as best shown in FIG. 2. The support rib 52 is utilized to provide additional structural support to walking beam assembly 20. As with the hangers 42/44, the support rib 52 has one or more downwardly extending tabs 48 that engage cooperatively positioned tab receiving openings in base plate 26.

One advantage of the configuration of the articulating carriage 10 of the present invention is that the orientation of the hangers 42/44 of the walking beam assembly 20 tends to keep the walking beam 20 stable when the wheels 38 of the caster assemblies 34/36 swivel. As shown, the hangers 42/44 are positioned outside the wheel center 39 of the wheels 38, even when the casters 34/36 swivel ninety degrees. Positioning the wheel centers 39 of wheels 38 between the hangers 42/44 provides a natural "cradle" effect that eliminates the normal tendency of the walking beam 20 to rock sideways as the casters 34/36 swivel.

To secure the hangers 42/44 and support rib 52, if utilized, to the base plate 26, a securing means is utilized, preferably to engagedly support the hangers 42/44 and support rib 52 on base plate 26. In a preferred embodiment of articulating carriage 10, the securing means is a clamping assembly comprising a first clamping plate 54 at the first end 30 and a second clamping plate 56 at the second end 32, as best shown in FIGS. 1 and 2. The clamping plates 54/56 have tab receiving openings 58 that are sized and configured to receive the upward extending tabs 60 on the hangers 42/44 and support rib 52 to facilitate positioning the various components and to provide structural support for the walking beam assembly 20. In the preferred configuration, clamping plates the 54/56 have apertures that are in corresponding relation to apertures on the base plate 26 and in the caster assemblies 34/36 such that a plurality of bolts can be utilized to clamp the hangers 42/44 and support rib 52 to the top surface of the base plate 26 and secure the caster assemblies 34/36 to the bottom surface of the base plate 26. The preferred embodiment also utilizes a plurality of clamping spacers 62, best shown in FIGS. 1, 2 and 6, between the clamping plates 54/56 and the base plate 26. The hangers 42/44 are supported by the caster assemblies 34/36, by being clamped between the clamping plates 54/56 and the base plate 26, to facilitate transferring the weight of the object 12 from the pedestal 12 to the walking beam assembly 20.

Figure 3:
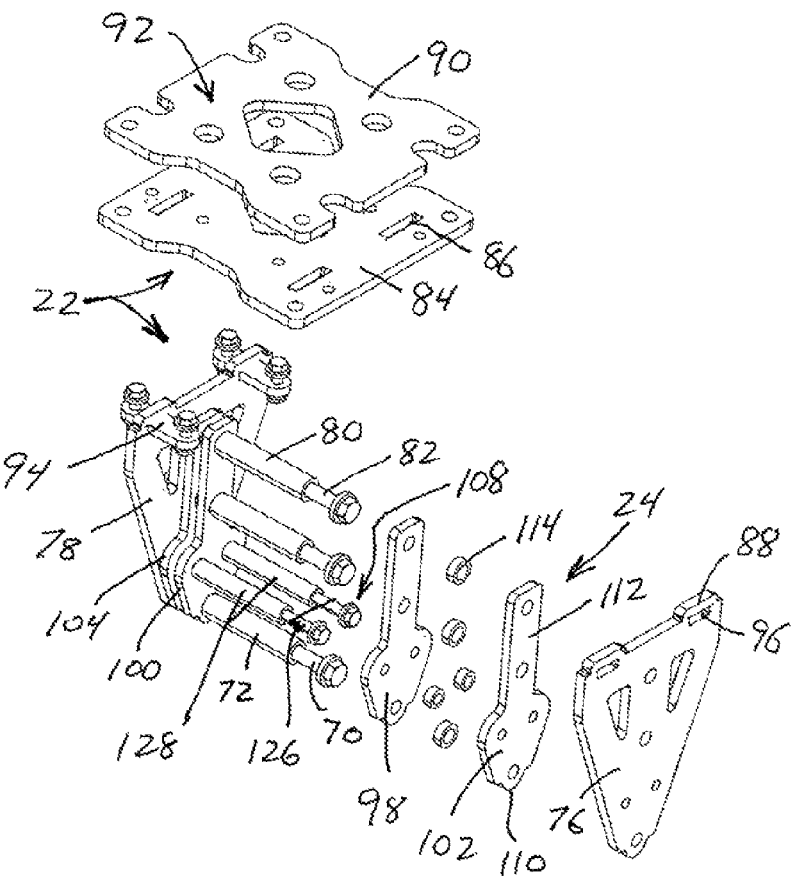
FIG. 3 is a partially exploded side perspective view of the pedestal of FIG. 1 showing the interacting fulcrum, bolts and spacers.
Figure 6:
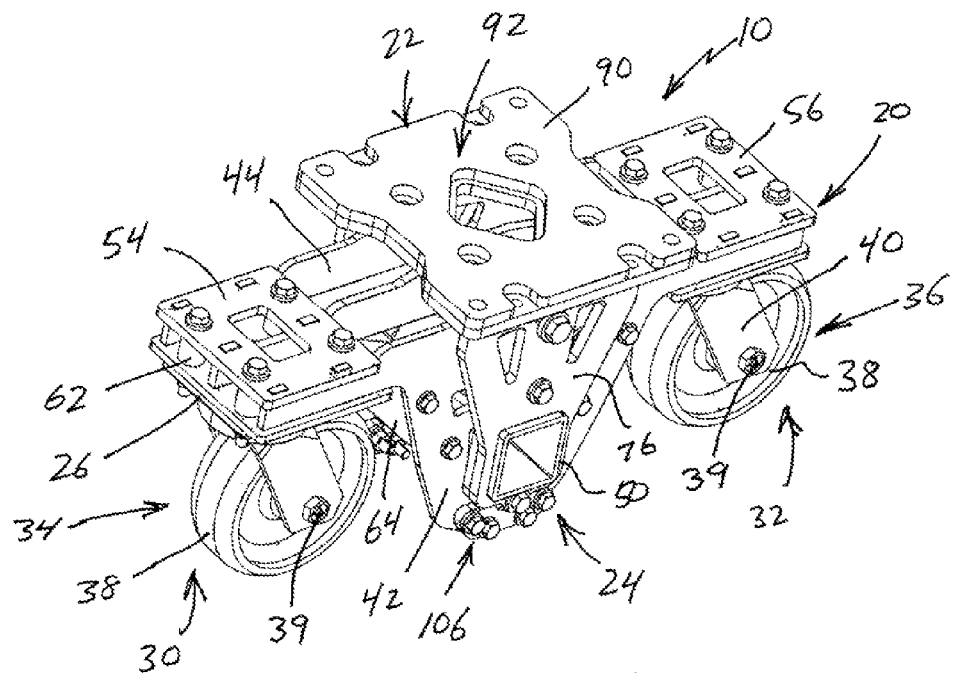
FIG. 6 is a side perspective view of an articulating carriage configured according to the principles and concepts of an alternative embodiment of the present invention showing the pedestal disposed at the walking beam assembly and use of a walking beam crosstube assembly.

As best shown in FIGS. 2 and 6, the preferred embodiment of walking beam assembly 20 comprises a pair of spacer tubes 64 below the base plate 26 that receive one or more bolts (two are shown) to maintain the hangers 42/44 in spaced apart relation below base plate 26, stabilize hangers 42/44 and provide additional structural support for walking beam assembly 20. The preferred embodiment of walking beam assembly 20 also comprises four rib spacer tubes disposed below base plate 26 that each receive a bolt therethrough. Each of the bolts preferably also pass through an aperture in a corresponding securing tab that extends downwardly from support rib 52. The bolts that pass through securing tabs also pass through apertures in the hangers 42/44, thereby more securely joining the support rib 52, base plate 26 and hangers 42/44. As best shown in FIGS. 2 and 3, an axis bolt 70 passes through an axis spacer 72, which maintains components of the pivoting means 24 in spaced apart relation, and an axis opening 74 at the bottom of the hangers 42 and 44. When all of the bolts are inserted through their proper apertures, spacers and other components, and engaged with a nut or other device at the threaded end, the walking beam assembly 20 is ready for use and will pivot as a single unit relative to the pedestal 22. No machining, welding or bending is required to form the walking beam assembly 20, thereby allowing a relatively unskilled person to quickly and effectively form walking beam assembly 20 for use with articulating carriage 10.

Figure 9:
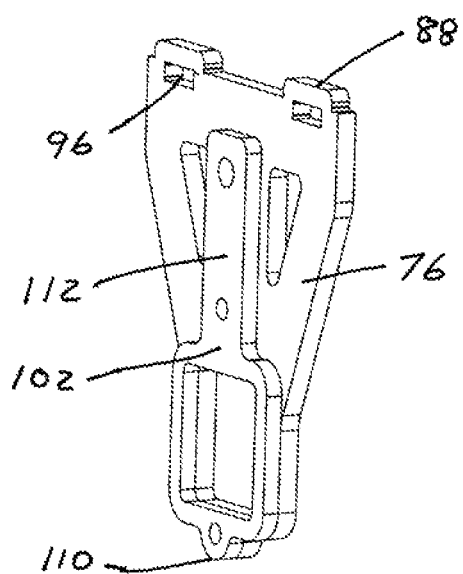
FIG. 9 is a side perspective view of the first outer fulcrum plate in abutting relation to the first support plate used in the embodiment of FIG. 6.

The pedestal 22 utilized with the articulating carriage 10 of the present invention connects the support base 18 supporting the object 12, or to the object 12 itself, above the surface 14 to the pivoting means 24 to transfer the weight of the object 12 to the walking beam assembly 20 and to the surface 14 through the wheels 38. In a preferred embodiment, the pedestal 22 comprises a pair of support plates, such as first support plate 76 and second support plate 78, that are separated by pedestal spacers 80 through which a bolt 82 passes to join the support plates 76/78 and yet maintain them in spaced apart relation, as best shown in FIGS. 2 and 3. The pedestal 22 also has a mounting plate 84 with a plurality of tab receiving openings 86 that are configured and positioned to receive the upwardly extending tabs 88 on support plates 76/78. Positioned above the mounting plate 84 is a spacer plate 90 having an upwardly facing support surface 92 that, in the embodiment of FIGS. 1 through 4, abuts the support base (i.e., frame) 18 or the object 12 and is attached thereto with one or more bolts. The mounting plate 84 is joined to the support plates 76/78 by passing bolts through apertures in bolt support tabs 94 that are received in tab slots 96 near the top end of the support plates 76/78, as best shown in FIGS. 3 and 9. Spacer plate 90 "floats" above the mounting plate 84 between the support base 18 and mounting plate 84.

Figure 4:
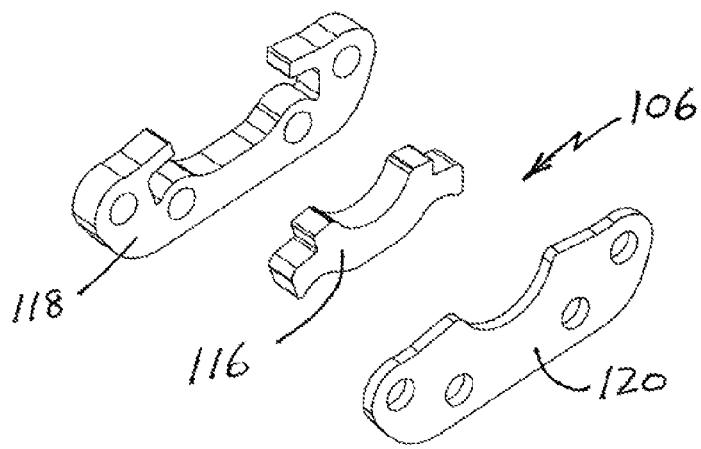
FIG. 4 is an exploded view of the bushing assembly of FIG. 1.

As stated above, the pivoting means 24 is configured to pivot the walking beam assembly 20 relative to the pedestal 22 when the wheels 38 contact a non-planar area 16 in the surface 14 across which the object 12 is being moved with articulating carriage 10. In the embodiment of FIGS. 1 through 4, the pivoting means 24 comprises two pairs of spaced apart fulcrum plates, namely a first inner fulcrum plate 98, a second inner fulcrum plate 100, a first outer fulcrum plate 102 and a second outer fulcrum plate 104, bushing assembly 106 at the bottom of each side of the hangers 42/44 and one or more pivot members 108 interconnecting the pairs of fulcrum plates 98/102 and 100/104, as best shown in FIGS. 2 and 3. First inner fulcrum plate 98 is spaced apart from the second inner fulcrum plate 100 by spacers, including axis spacer 72 and pedestal spacer 80. Each inner fulcrum plate 98/100 is in abutting relation or near abutting relation with the inner surface of their respective hangers 42/44 and each outer fulcrum plate 102/104 is in abutting relation or near abutting relation with the outer surface of their respective hangers 42/44. Each fulcrum plate 98-104 has a contact surface 110 that contacts its respective bushing assembly 106 to allow the hangers 42/44 and, therefore the walking beam assembly 20, to pivot relative to the pedestal 22. As shown in the embodiment of FIGS. 1 through 4, each fulcrum plate 98-104 has an upward extending elongated tang 112, which extend upward through the notched section 122 of the outer side edges 124 of base plate 126, that provides additional stabilization to the structure of pedestal 22. Preferably, the tangs 112 do not contact the base plate 126 during the pivot action to avoid possible deformation of base plate 126 over time. The elongated tangs 112 provide lateral support and acts as a stiffener for the pedestal 22. The fulcrum plates 98-104 have a plurality of apertures for the bolts that traverse the hangers 42/44, including the axis bolt 70 about which the hangers 42/44 pivot. The first 102 and second 104 outer fulcrum plates abut their respective support plates 76/78 and are maintained in spaced apart relation with their respective inner fulcrum plates 98/100 by fulcrum spacers 114, as best shown in FIG. 3. In the preferred embodiment, each bushing assembly 106 comprises a replaceable bushing 116, a bushing holder 118 and a bushing containment plate 120, as best shown in FIG. 4. Preferably, bushing 116 is made out of bronze or like material. If desired, the multiple layers of bushing 116 and bushing holder 118 can be "stacked" between the hangers 42/44 and containment plate 120 depending on the load support requirements.

To achieve the desired pivoting of the hangers 42/44, a portion of which are disposed between the respective set of inner and outer fulcrum plates 98/102 and 100/104, in response to the wheel 38 of the leading or first caster assembly 34 contacting the non-planar area 16, the one or more pivot members 108 are configured to extend through the articulation openings 50 of the hangers 42/44. In addition, the pivot members 108 are configured to engage the upper edge of the articulation openings 50 to contain the downward movement of the hangers 42/44 and, therefore, the sides of the walking beam assembly 20 when the articulating carriage 10 is lifted off of the floor or other surface 14. As the pedestal 22 remains stationary, carrying the object 12 (directly or indirectly), the walking beam assembly 20 is allowed to move, through the movement of the hangers 42/44 relative to the stationary pivot members 108 disposed inside the articulation openings 50, in response to a wheel 38 contacting the non-planar area 16 of the surface 14 across which the object 12 is being moved. The hangers 42/44 pivot about the axis bolt 70. To prevent damage to the various components of articulating carriage 10, the amount of pivoting by the walking beam assembly 20 is limited by a pivot limiting means. In the embodiment of articulating carriage 10 shown in FIGS. 1 through 4, the pivot limiting means comprises the forward and rearward edges of the articulation openings 50, as best shown in FIG. 2. As will be readily apparent to those skilled in the art, the pivoting movement of the hangers 42/44 will be limited by the forward or rearward edges of articulation openings 50 making contact against the stationary pivot members 108.

Figure 5B:
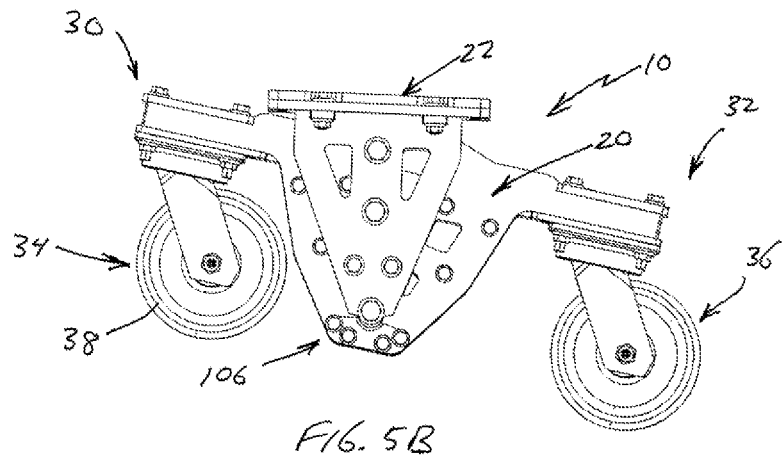
Figure 5C:
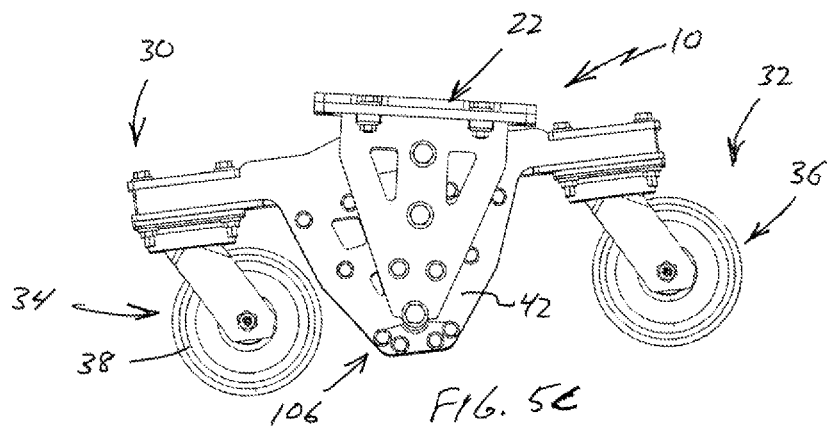

In the embodiment shown in FIGS. 1 through 4, the pivot members 108 are two or more bolts, such as the two shown as 126, which have spacers 128 disposed between the pair of inner fulcrum plates 98/100, as best shown in FIG. 3. The two bolts 126 prevent pivoting of the fulcrum plates 98-104 but allow, due to the articulation openings 50, the hangers 42/44 to pivot in response to the wheel 38 of the first caster assembly 34 contacting the non-planar area. The operation of this embodiment is shown in FIGS. 5A through 5C. FIG. 5a shows the articulating carriage 10 as it moves across a level surface 14 aligning the vertical axis of both the walking beam assembly 20 and the pedestal 22. FIG. 5B shows the wheel 38 of the leading or first caster assembly 34 moving upward in response to contact with a non-planar area 16 on the surface 14. As shown, the walking beam assembly 20 will tilt upward at the leading end 30 of the articulating carriage 30, moving the vertical axis of the walking beam assembly 20 out of alignment (i.e., angled rearward) with the vertical axis of the pedestal 22 while maintaining the support surface 92 of spacer plate 90 of the pedestal 22 in a horizontal position, thereby not tilting the object 12 being moved by articulating carriage 10 of the present invention. The low driving moment that results from the positioning of the pivot point, which is where the contact surface 110 of the fulcrum plates 98-104 pivotally engages at the bushing assembly 106 below a horizontal plane (shown as 129 on FIG. 5A) through the rotating axis of the wheels 38, directs inertial forces up and over the non-planar area 16 on surface 14 to greatly reduce mobile resistance. In contrast, conventional casters direct the inertial forces down and into the non-planar area 16, which increases resistance to movement. FIG. 5C shows the wheel 38 of the second caster assembly 36 at the second or trailing end 32 of the articulating carriage 10 moving upward in response to contacting the non-planar area 14. This pivots the walking beam assembly 20 in the opposite direction, with the vertical axis of the walking beam assembly 20 in non-alignment with the vertical axis of the pedestal 22. The support surface 92 of spacer plate 90 of the pedestal 22 remains in a horizontal position, thereby not tilting the object 12 being moved by articulating carriage 10 of the present invention. After the articulating carriage 10 has passed the non-planar area 14, it will return to the configuration shown in FIG. 5a.

Figure 7:
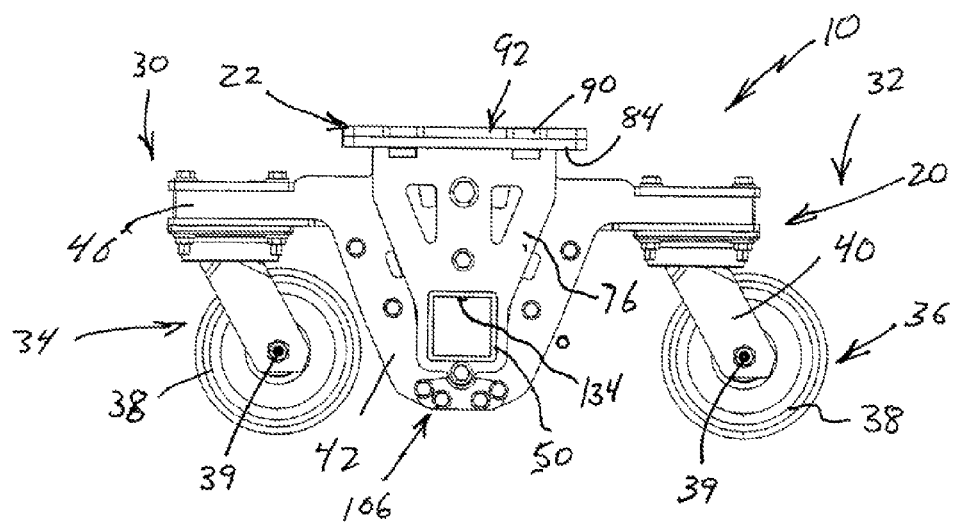
FIG. 7 is a side view of the articulating carriage of FIG. 6.
Figure 8:
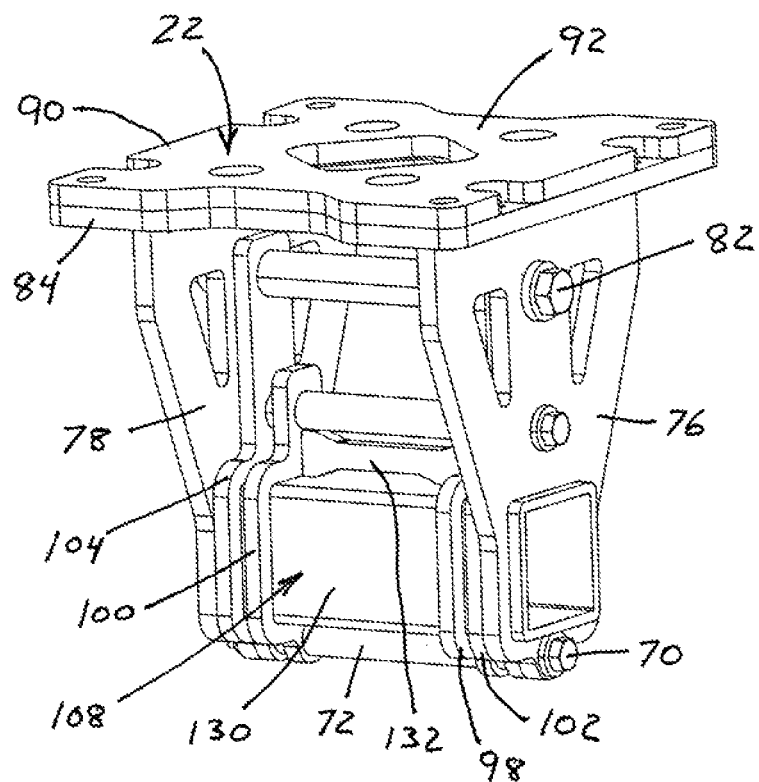
FIG. 8 is a side perspective view of the pedestal and the walking beam crosstube assembly of the articulating carriage of FIG. 6.
Figure 10:
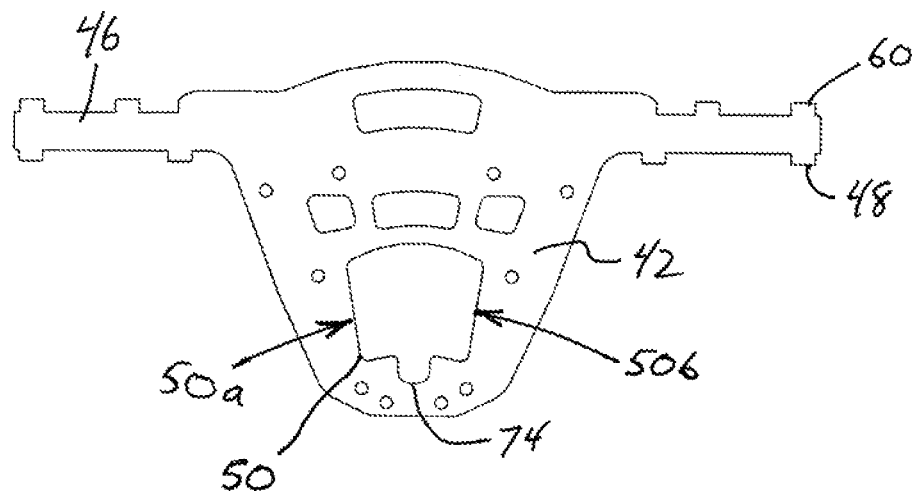
FIG. 10 is a side view of the first hanger utilized with the articulating carriage of FIG. 6.
Figure 11:
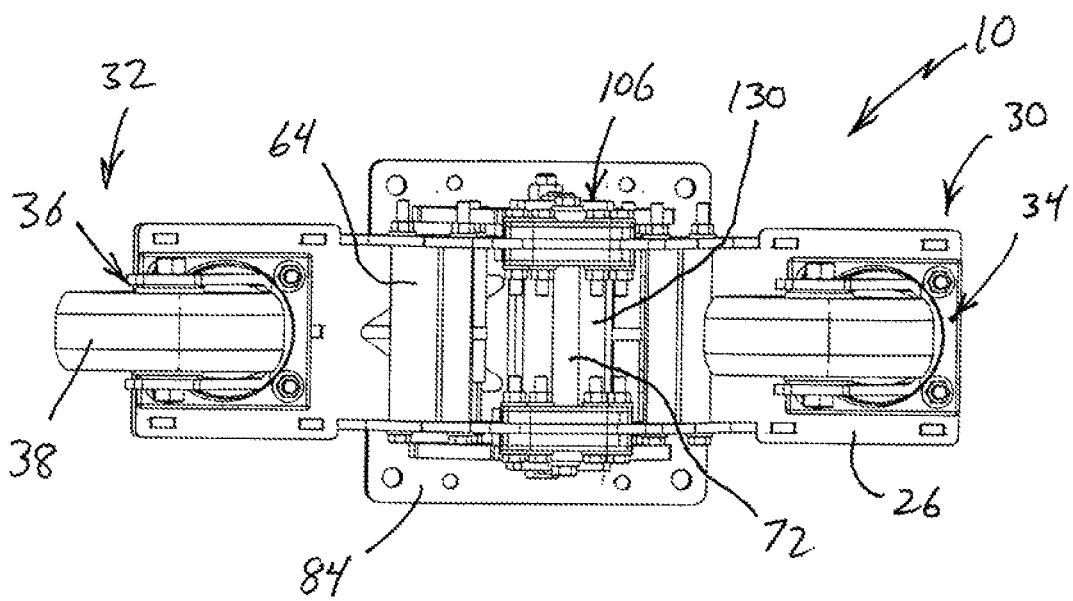
FIG. 11 is a bottom view of the articulating carriage of FIG. 6.
Figure 12:
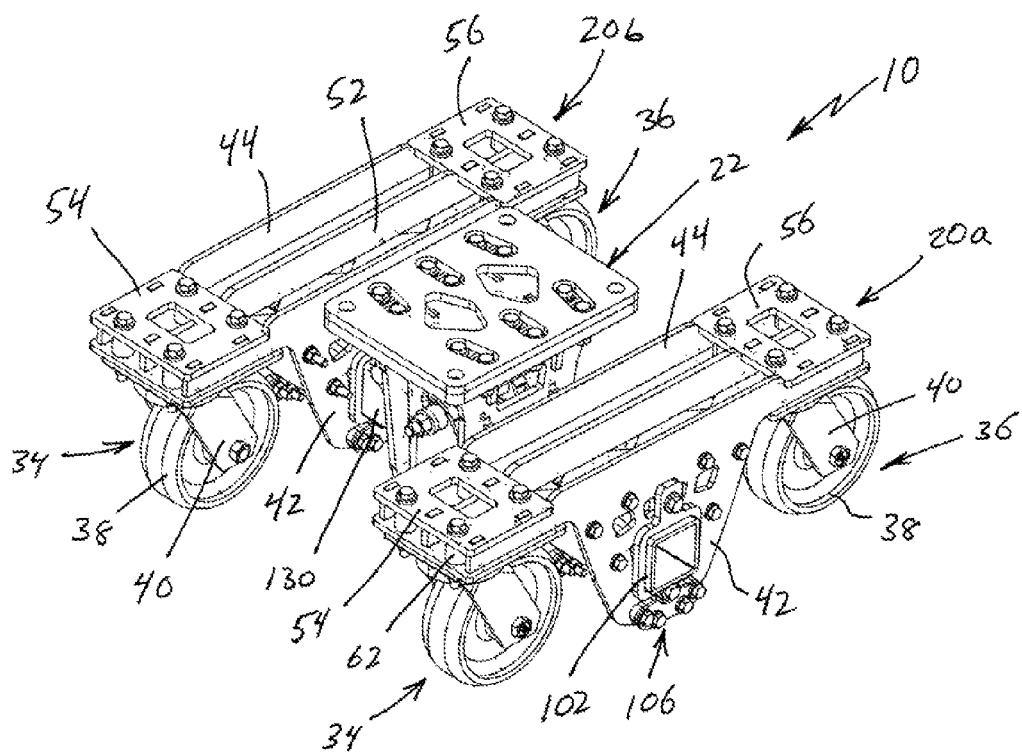
FIG. 12 is a top perspective view of an articulating carriage configured according to the principles and concepts of one of the preferred embodiments of the present invention showing the pedestal disposed on a crosstube interconnecting a pair of spaced apart walking beam assemblies.
Figure 13:
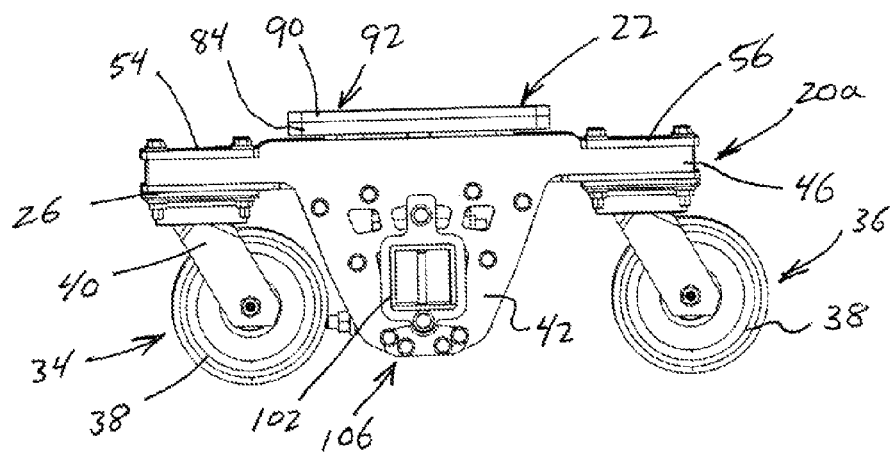
FIG. 13 is a side view of the articulating carriage of FIG. 12.
Figure 14:
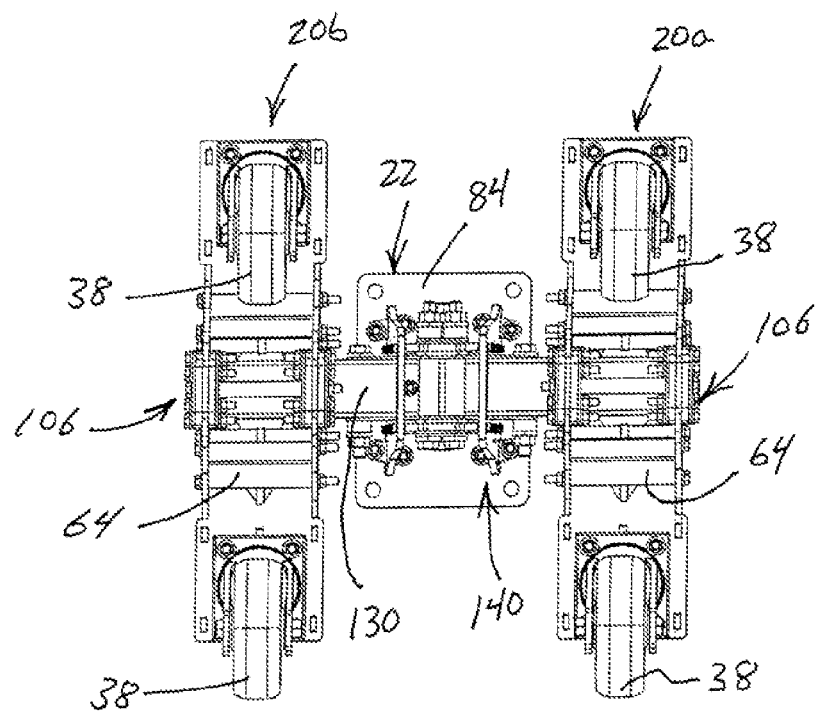
FIG. 14 is a bottom view of the articulating carriage of FIG. 12.
Figure 15:
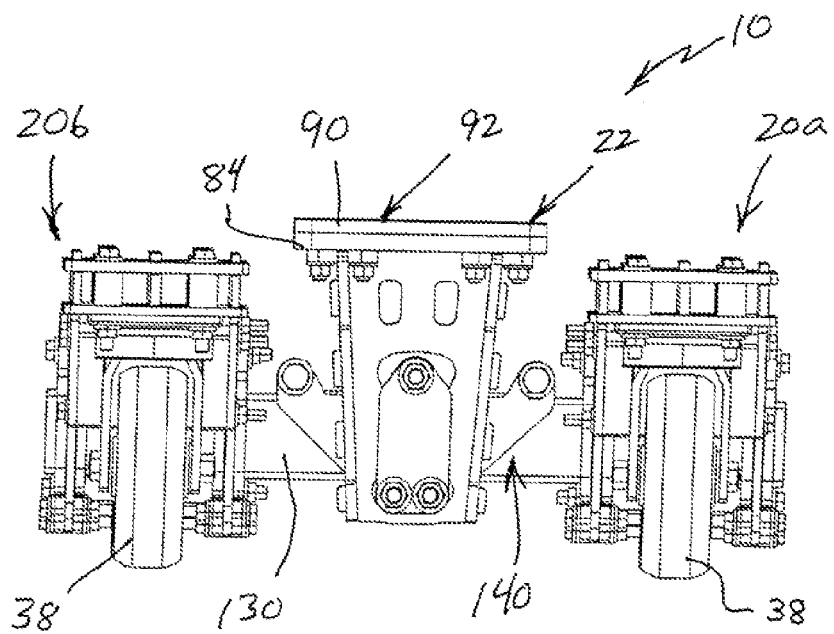
FIG. 15 is a front or leading end view of the articulating carriage of FIG. 12.

An alternative configuration of the articulating carriage 10 of the present invention is shown in FIGS. 6 through 11. In this embodiment, the general components are the same as described above except that the pivoting means 24 and associated components are configured differently. Instead of the one or more pivot members 108 being the bolts 126, in this embodiment the pivot member 108 is a tubular shaped crosstube 130, best shown in FIGS. 8 and 11. The articulation opening 50, best shown in FIG. 10, is cooperatively sized and shaped to receive the crosstube 130 through the articulation opening 50 and to allow the hangers 42/44 to pivot the desired amount. The pivot limiting means comprises the forward 50a and rearward 50b edges of the articulation opening 50, as shown in FIG. 10. The axis opening 74 for axis bolt 70 is incorporated into the articulation opening 50. To accommodate the tubular cross-section of the crosstube 130, the apertures in the fulcrum plates 98-104 are cooperatively sized and shaped to allow the crosstube 130 to pass therethrough, as best shown in FIG. 8. As shown, the inner fulcrum plates 98/100 can have a shorter upward extending section 112. As with the embodiment described above, the contact surface 110 of the fulcrum plates 98-104 engages the bushing 116 of the bushing assembly 106 to allow the hangers 42/44, and therefore the walking beam assembly, to pivot when a wheel 38 contacts a non-planar area 16. The crosstube 130 also provides lateral support and acts as a stiffener for the pedestal 22.

Figure 16:
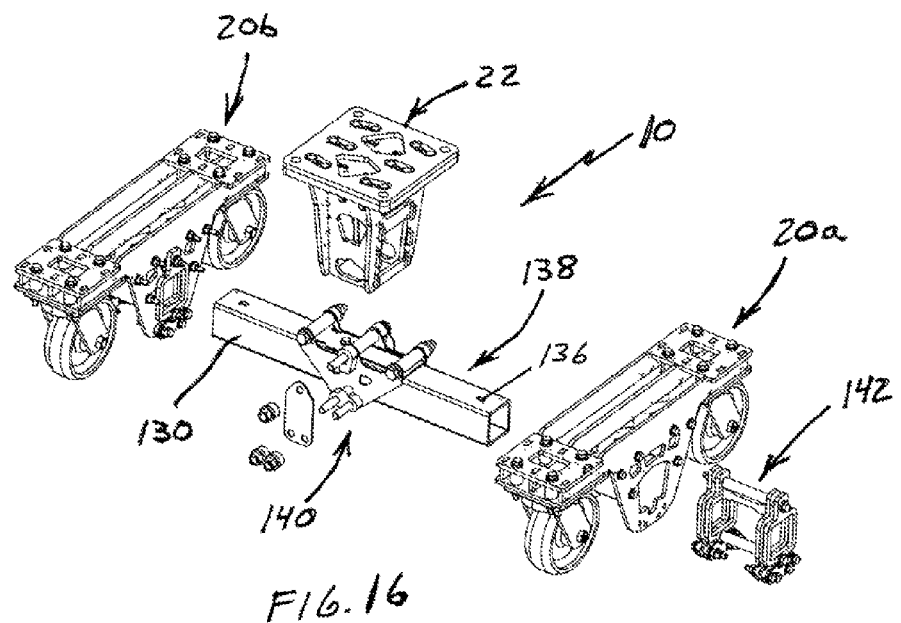
FIG. 16 is a partially exploded top perspective view of the articulating carriage of FIG. 12.
Figure 17:
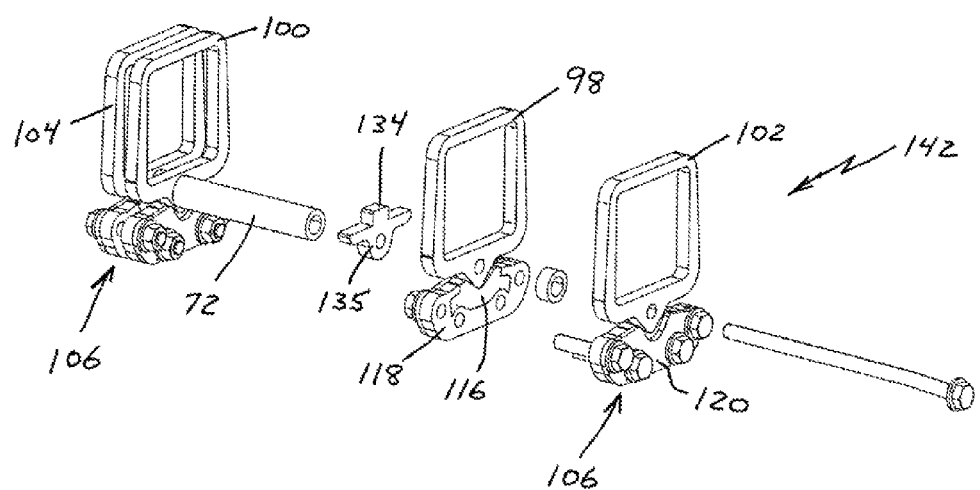
FIG. 17 is a partially exploded side perspective view of an alternative fulcrum assembly for use with an articulating carriage of the present invention having a locating aperture on the bottom side of the crosstube.
Figure 18:
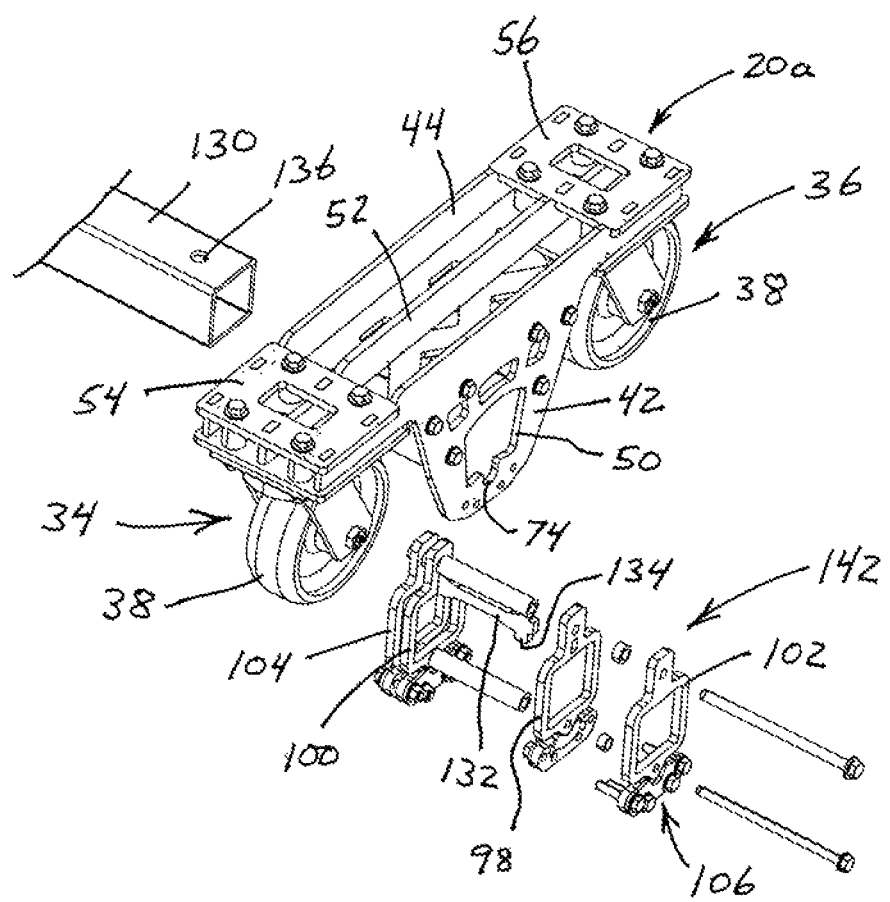
FIG. 18 is a partially exploded side view of a preferred configuration for the first walking beam assembly of the articulating carriage of FIG. 12.

The above embodiment also shows the use of a thrust stop 132 between the inner fulcrum plates 98/100, as best shown in FIG. 8. As shown in FIGS. 7, 16 and 18, the thrust stop 132 has a locating tab 134, downwardly disposed in the present embodiment (shown in FIG. 7 extending down below the upper wall of the crosstube 130), that engages a similarly configured locating aperture 136 positioned on the top of the crosstube 130, typically toward the end of crosstube 132 (as shown in FIG. 18). Thrust stop 132 positions the inner fulcrums 98/100 on crosstube 130, which provides the proper position for the other components, which abut, attach to or are clamped by the inner fulcrums 98/100. In addition, the thrust stop 132 keeps the walking beam from coming off of crosstube 130. FIG. 17 shows the use of a locating tab 134 that is configured to engage a locating aperture 136 positioned on the bottom of the crosstube 130. In this embodiment, locating tab 134 is a component of a separate tab member 135 that abuts the end of axis spacer 72.

Figure 26:
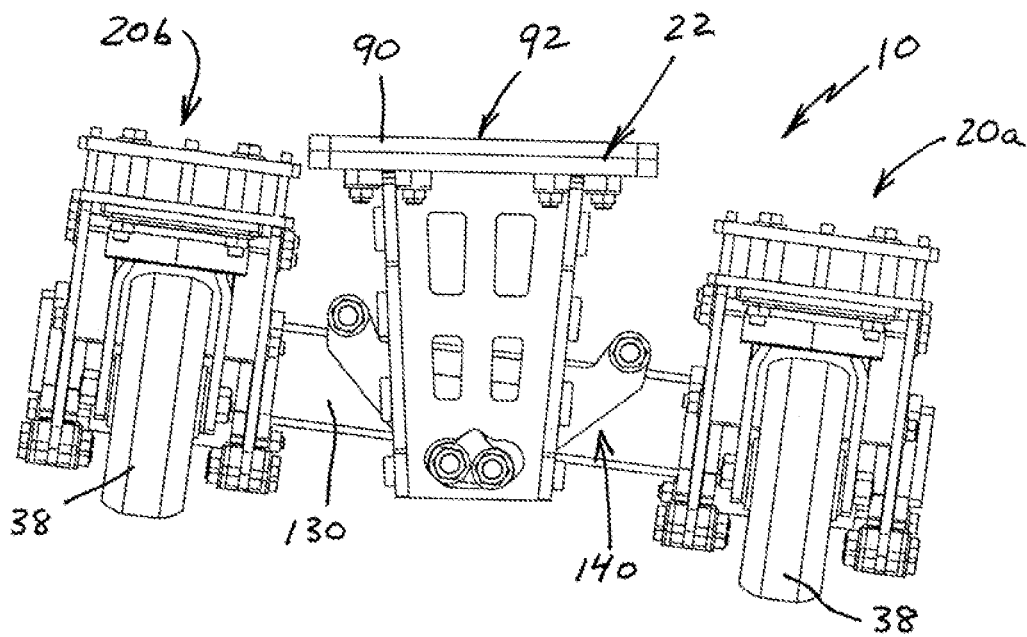
FIG. 26 is a front view of an articulating carriage having a rectangular crosstube shown with its left side pivoting upward relative to the right side.
Figure 27:
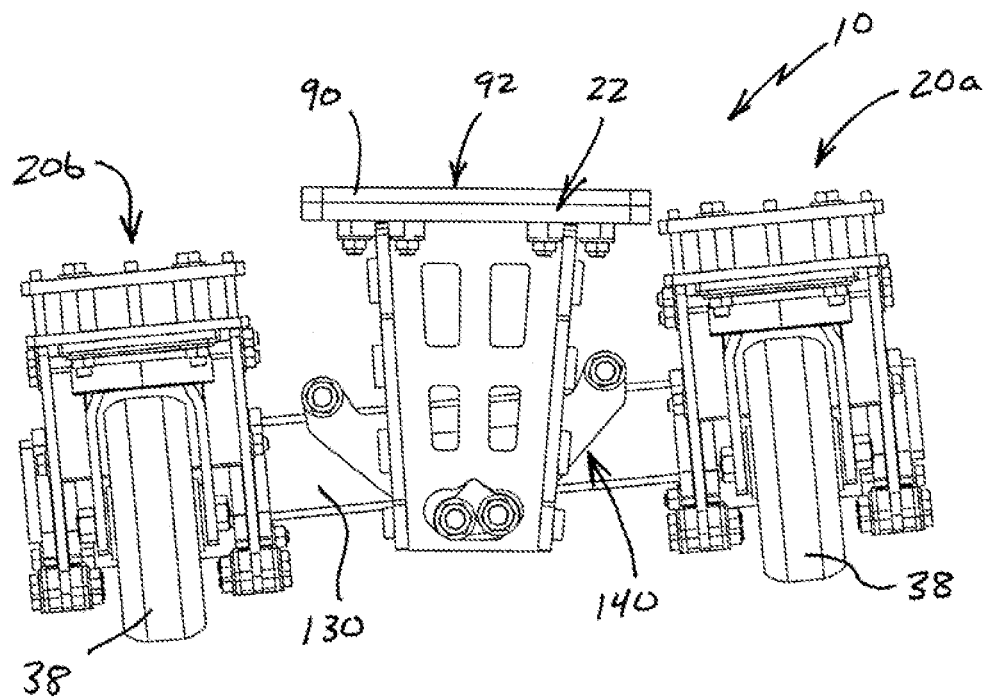
FIG. 27 is a front view of the articulating carriage of FIG. 26 shown with its right side pivoting upward relative to the left side.

Another preferred embodiment of the articulating carriage 10 of the present invention is shown in FIGS. 12 through 27. In this embodiment, the articulating carriage 10 comprises a first walking beam assembly 20a, a second walking beam assembly 20b, a crosstube assembly 138 connecting the first 20a and second 20b walking beam assemblies and a pedestal 22 supported by the crosstube assembly 138, as best shown in FIGS. 12 through 16. As with the previously described embodiments, the first 20a and second 20b walking beam assemblies each have, in the preferred embodiment, first 42 and second 44 hangers held in place against a base plate 26 by first 54 and second 56 clamping plates (which also hold in place support rib 52), a first caster assembly 34 and second caster assembly 36 each having at least one wheel 38, and at least one articulation opening 50 for receiving the pivot member 108, which is crosstube 130. The configuration and utilization of these components is the same as described above, except as to the use of the two walking beam assemblies 20a and 20b, which provides improved side directional performance, improved floatation of pedestal 22 and load carrying capacity for articulating carriage 10. The crosstube 130 in this embodiment is configured and has a length necessary to obtain the desired spacing between the first 20a and second 20b walking beam assemblies. This embodiment also includes a yoke assembly 140 for securing the pedestal 22 to the crosstube 130 and a modified fulcrum assembly 142, which is a component of each of the walking beam assemblies 20a/20b, for allowing pivotal movement of the walking beam assemblies 20a/20b separate from the pedestal 22. In this embodiment, the interaction between the hangers 42/44 and the crosstube 130, provided by the fulcrum assemblies 142, allows the walking beam assemblies 20a/20b to pivot up and down in the front to back direction, as previously described and shown in FIGS. 24 and 25 (showing the articulating carriage 10 moving over a generally planar surface in FIG. 24 and contacting a non-planar area 16 in FIG. 25). The yoke assembly 140 also allows each of the walking beam assemblies 20a/20b to pivot up and down in the left to right direction (looking from the end as in FIG. 15) in response to one or more of the wheels 38 contacting a non-planar area on the surface 14, as shown in FIGS. 26 and 27. As with the embodiments described above, placement of the bushing assembly 106 at the bottom of the hangers 42/44 gives articulating carriage 10 a low driving moment that directs inertial forces up and over non-planar areas 16, which greatly reduces mobile resistance, as opposed to conventional casters that direct inertial forces down and into an obstacle, which increases resistance to movement.

As set forth above, the embodiment shown in FIG. 17 has the thrust stop 132 incorporated into or aligned with an axis spacer 72 with the locating tab 134 disposed upward to engage a locating aperture 136 on the bottom side of the crosstube 130 near the end of the crosstube 130 where it joins either the first 20a or second 20b walking beam assembly. The preferred embodiment, which is shown in FIG. 18, has the thrust stop 132 positioned near the top of the second inner fulcrum plate 100 and having the locating tab 134 directed downward to engage a locating aperture 136 on the top surface of crosstube 130, which has been found to provide better support for the fulcrum assembly 142.

Figure 19:
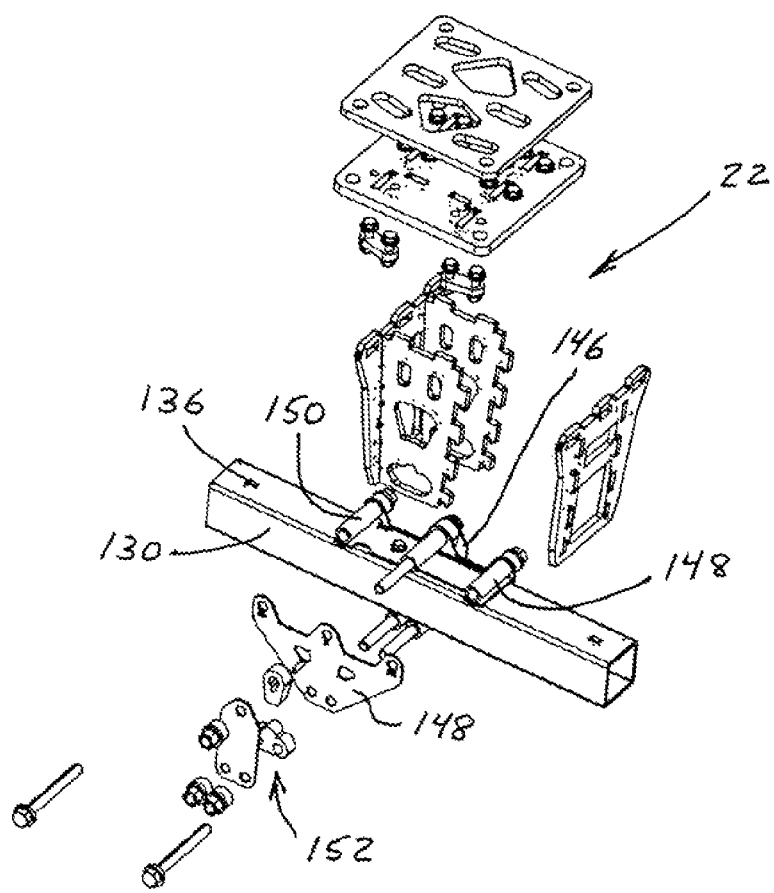
FIG. 19 is a top perspective view of the walking beam crosstube assembly of the articulating carriage of FIG. 12 showing the pedestal, crosstube and yoke assembly.
Figure 20:
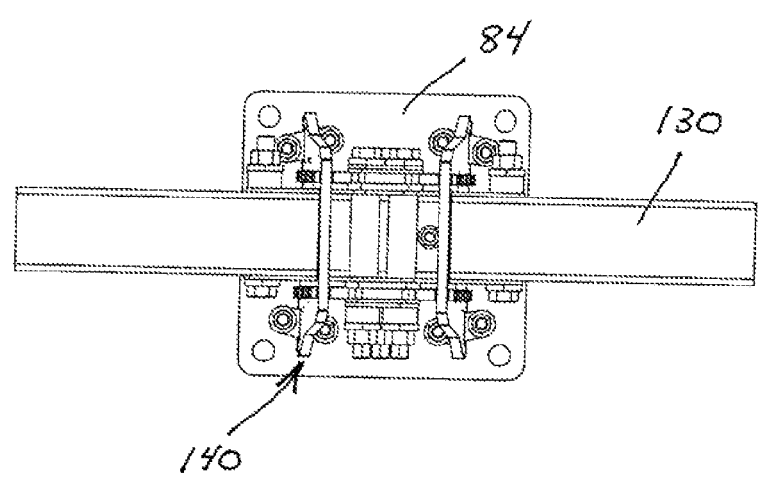
FIG. 20 is a bottom view of the walking beam crosstube assembly of FIG. 19.

The yoke assembly 140 comprises two pairs of yoke arm sets 144 and 146 that connect to yoke tubes 148 and 150, respectively, as best shown in FIGS. 16 and 19. In addition to providing the low pivot point that results in the lower driving moment, the yoke assembly 140 is utilized to spread the weight of the object 12 over a greater area of the crosstube 130. Yoke arm sets 144/146 are connected below the crosstube 130 to a crosstube swivel 152 that allows pivotal movement of the yoke arm sets 144/146 so the crosstube 130 may pivot up and down in the right to left direction in response to one or more of the wheels 38 contacting a non-planar area 16 while moving across surface 14. In the preferred embodiment, crosstube swivel 152 is a simplified pivoting mechanism that is virtually maintenance free and impervious to rust, dirt, ice and temperature. If desired, the fulcrum in the crosstube swivel 152 can be hardened for added durability. Generally, however, this is not believe to be necessary due to the limited amount of pivoting that takes place at crosstube swivel 152. In the preferred embodiment, shown in the figures, the yoke assembly 140 is positioned at the bottom of pedestal 22, as best shown in FIG. 19.

Figure 21:
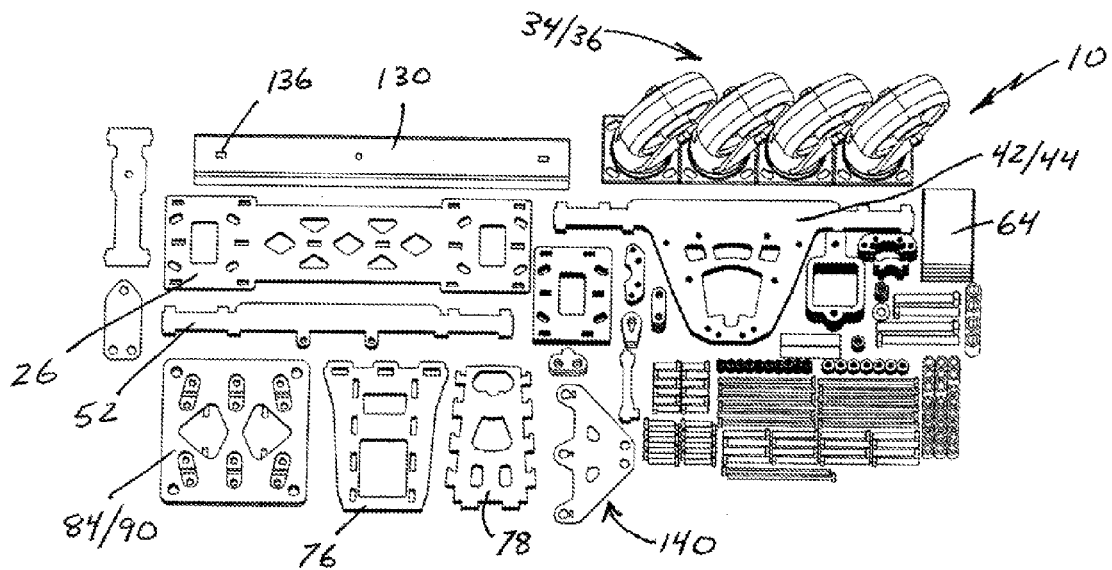
FIG. 21 is a top perspective view of the disassembled components of the articulating carriage of FIG. 12.

The various components that make up the articulating carriage 10 of the embodiment shown in FIGS. 12 through 20 and 22 are shown disassembled in FIG. 21. As stated above, one of the benefits of the articulating carriage 10 of the present invention is that no machining, welding, bending or fitting of parts is needed to assemble articulating carriage 10. Instead, all parts are made out of common material, such as steel (except the bushing 116) that is laser cut, chopped and/or drilled to the desired shape and configuration. The articulating carriage 10 can be shipped to the user disassembled and they can put the various parts together using bolts and without the use of highly skilled labor.

Figure 22:
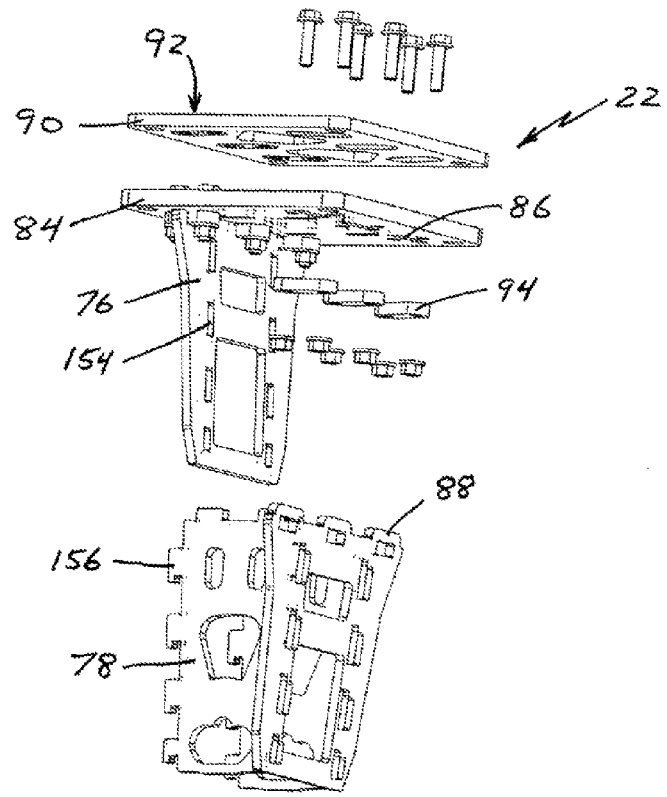
FIG. 22 is a side perspective, partially exploded view of the pedestal used with the articulating carriage of FIG. 12.
Figure 23:
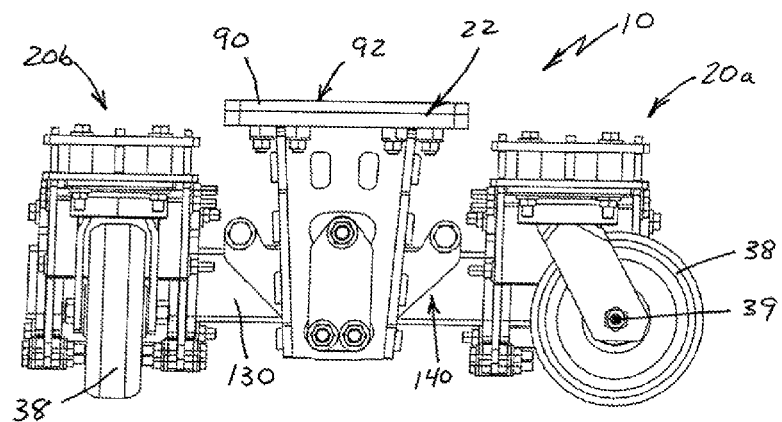
FIG. 23 is a front or leading end view of the articulating carriage of FIG. 12 showing one of the wheels pivoted ninety degrees relative to the other wheel.
Figure 24:
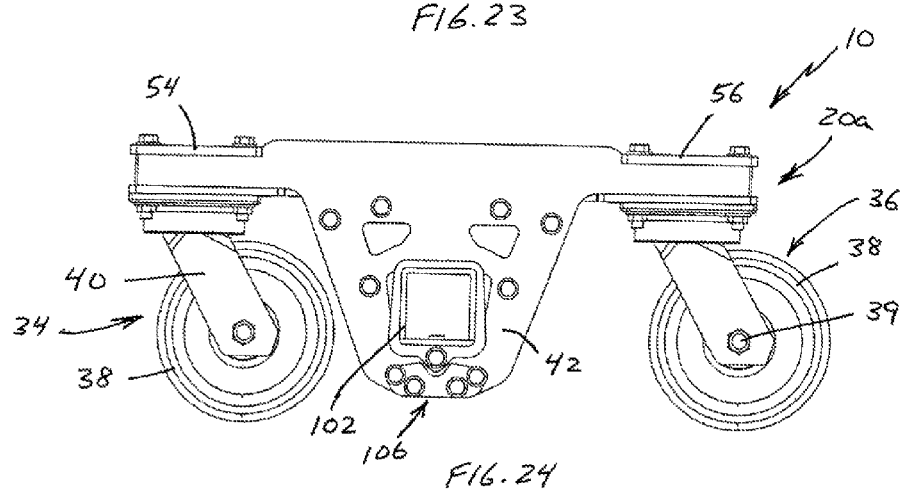
FIG. 24 is a side view of an articulating carriage having a rectangular crosstube shown moving across a generally planar surface.
Figure 25:
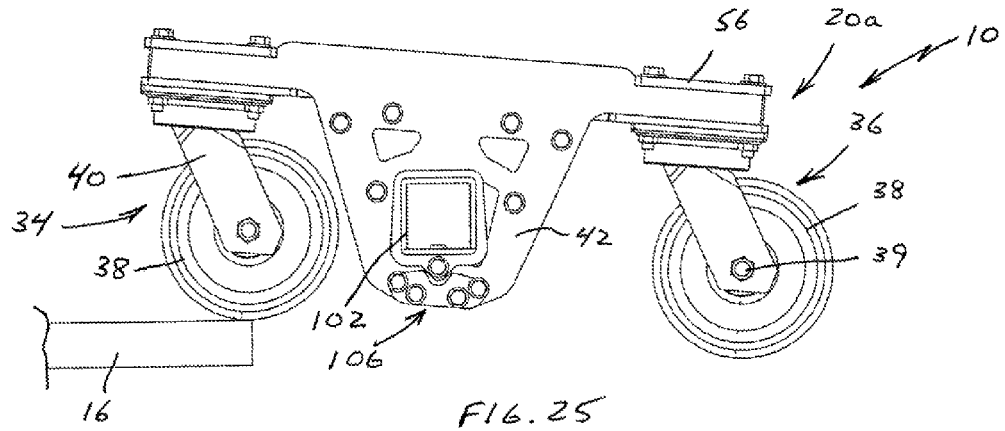
FIG. 25 is a side view of the articulating carriage of FIG. 24 shown contacting and moving across a non-planar area.

As with the other components of articulating carriage 10 of the present invention, the pedestal 22 is configured to be put together with only the use of bolts and without the need for highly skilled labor. As best shown in FIG. 22, the preferred pedestal 22 for the embodiment shown in FIGS. 12 through 20 comprises a pair of first support plates 76 and a pair of second support plates 78 that are configured for interlocking engagement. The first support plates 76 have a plurality of tab receiving openings 154 that are each sized and configured to receive one of the hooked tabs 156 on second support plate 78. As described above, the bolt support tabs 94 are utilized to connect the mounting plate 84 to the support plates 76, with the spacer plate 90 in a "floating" relationship above the mounting plate 84 such that it is clamped between the mounting plate 84 and the support base 18 with the bolts that secure the support base 18 to articulating carriage 10. The interlocking configuration prevents the pedestal 22 from coming apart due to the weight of object 12 being supported and moved by articulating carriage 10.

Another alternative embodiment of the articulating carriage 10 of the present invention is shown in FIG. 28. In this embodiment, the crosstube 130 is rotated such that the articulation opening 50 pivots directly against a corner of the rotated square tube. Depending on the weight of object 12, this configuration may allow the for cost savings with regard to the manufacture of the articulating carriage 10. A modified bushing assembly 106, such as that shown in FIGS. 29 through 31, can be utilized with the embodiment of FIG. 28. In the modified bushing assembly 106, the material in the corners (shown as 158) of the bushing containment plate 120 and in hangers 42/44 is relieved back so the replaceable bronze bushing 116 takes the direct down pressure from crosstube 130 instead of the corners 158 in hangers 42/44 or the containment plate 120. In an alternative embodiment, the bushing assembly 106 can be eliminated such that the corner of the rectangular crosstube 130 will ride directly against the inside of the hanger opening, shown as 159 in FIG. 28, of the hangers 42/44.

Figure 32:
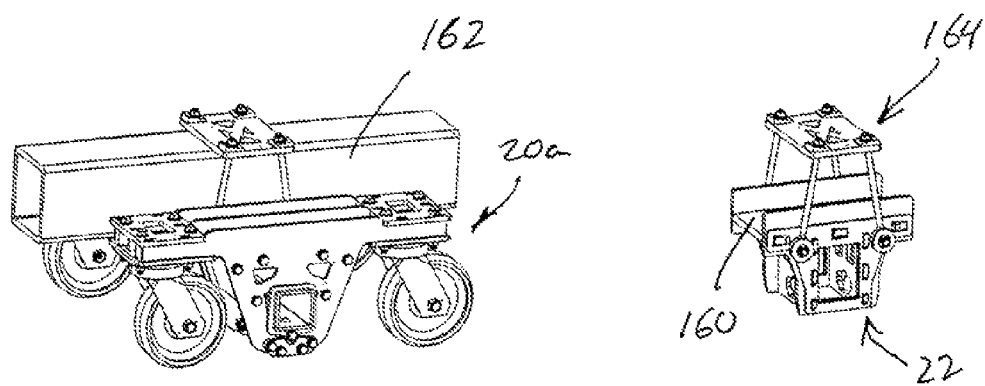
FIG. 32 shows a saddle mounting system used with an alternative embodiment of the articulating carriage of the present invention.
Figure 33:
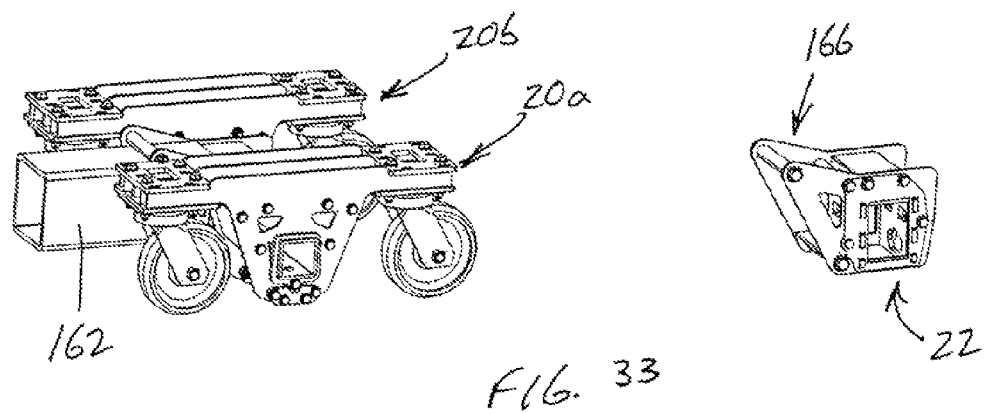
FIG. 33 shows a side mounting system used with the embodiment of the articulating carriage shown in FIG. 32.

The embodiments of the articulating carriage 10 of the present invention described above utilize a top plate mounting system comprising the mounting plate 84 and spacer plate 90, which is shown in use moving a large shipping container as the object 12 in FIG. 34. The embodiment of FIGS. 32 and 33 show alternative mounting types. The embodiment of FIG. 32 is a saddle mounting system that comprises a pedestal 22 that engages the crosstube 130 that connects pairs of walking beam assemblies 20a/20b, a saddle member 160 which receives a frame member 162 of the support frame 18 on which the object 12 sits and a upper clamping mechanism 164 that engages the top of the frame member 162 and holds it against the saddle member 160. An example use of this mounting system is shown in FIG. 35 that is used to move an engine. The embodiment of FIG. 33 shows is a side mounting system comprising a bracket mechanism 166 that receives an end of a frame member 162 to moveably support the frame member 162 as the object 12 is moved across the surface 14. As will be readily apparent to those skilled in the art, this configuration provides a lower positioned surface for carrying object 12.

Figure 36:
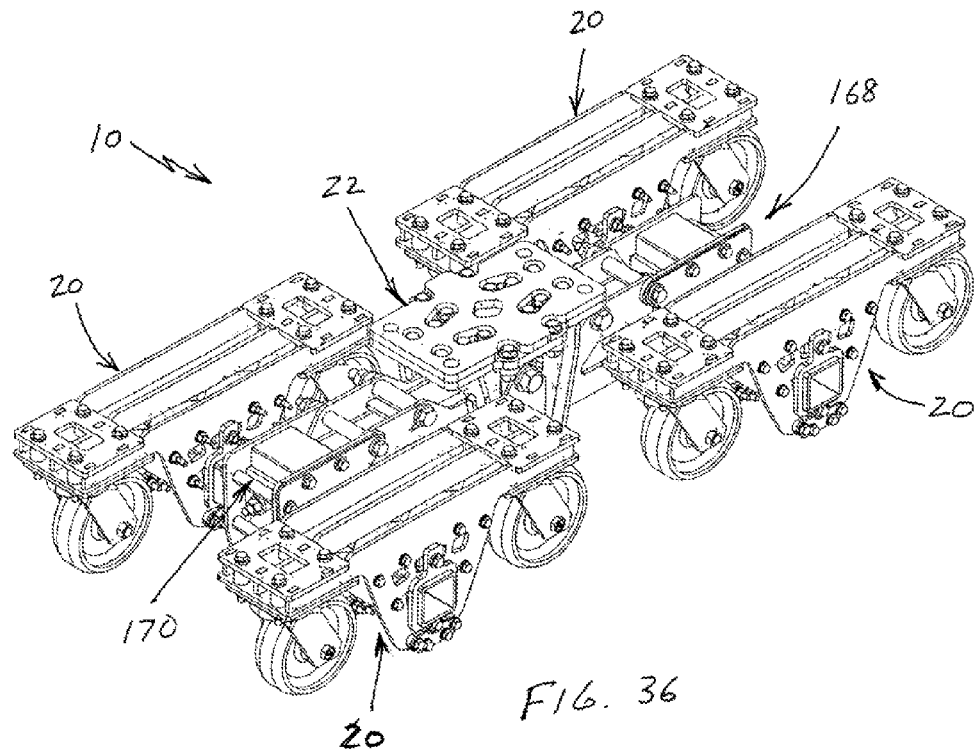
FIG. 36 is a top perspective view of an alternative embodiment of the present invention shown with four walking beam assemblies and a major crosstube assembly supporting a pedestal between the walking beam assemblies.
Figure 37:
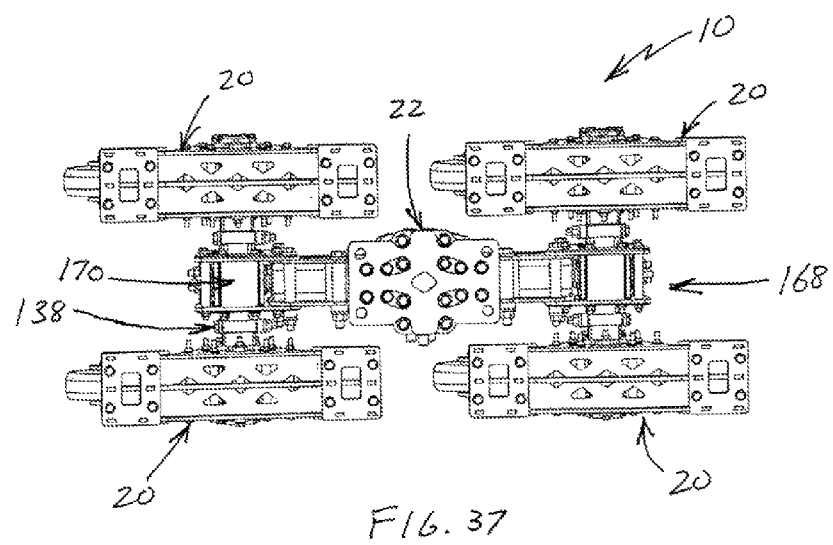
FIG. 37 is a top view of the articulating carriage of FIG. 38.
Figure 38:
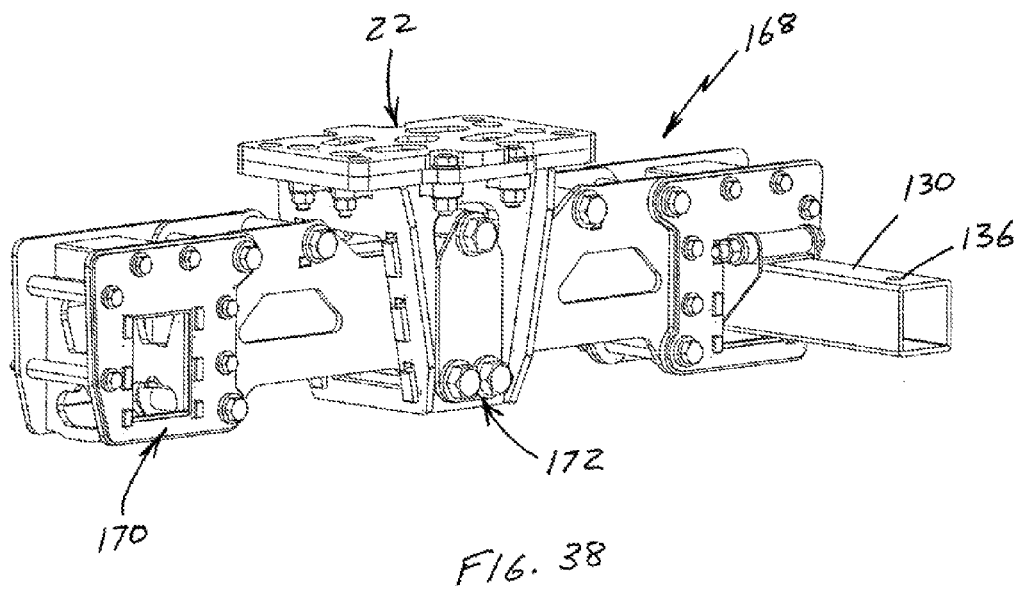
FIG. 38 is a side perspective view of the major crosstube assembly and pedestal of FIG. 36.
Figure 39:
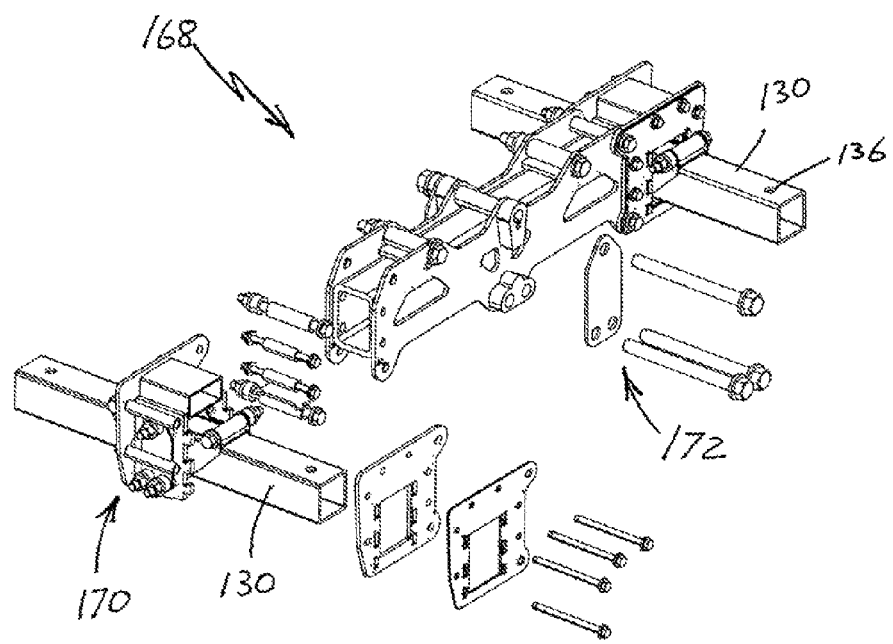
FIG. 39 is a partially exploded view of the major crosstube assembly utilized in FIG. 36.
Figure 40:
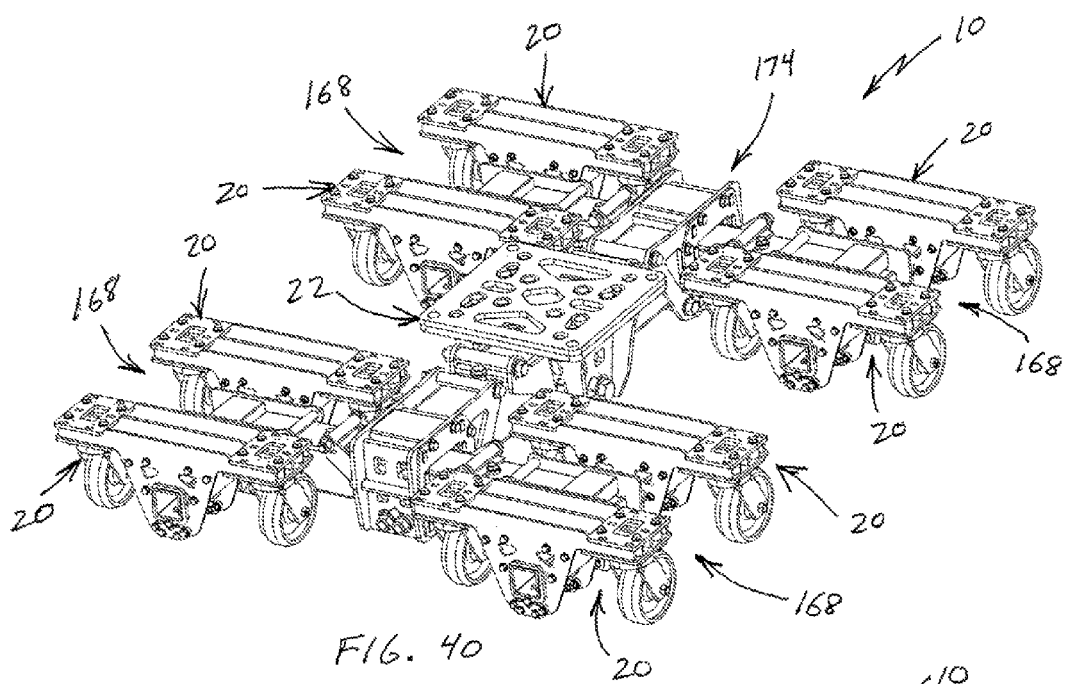
FIG. 40 is a top perspective view of an alternative embodiment of the present invention shown with eight walking beam assemblies and a compound crosstube assembly supporting a pedestal and connecting the major crosstube assemblies that interconnects the walking beam assemblies.
Figure 41:
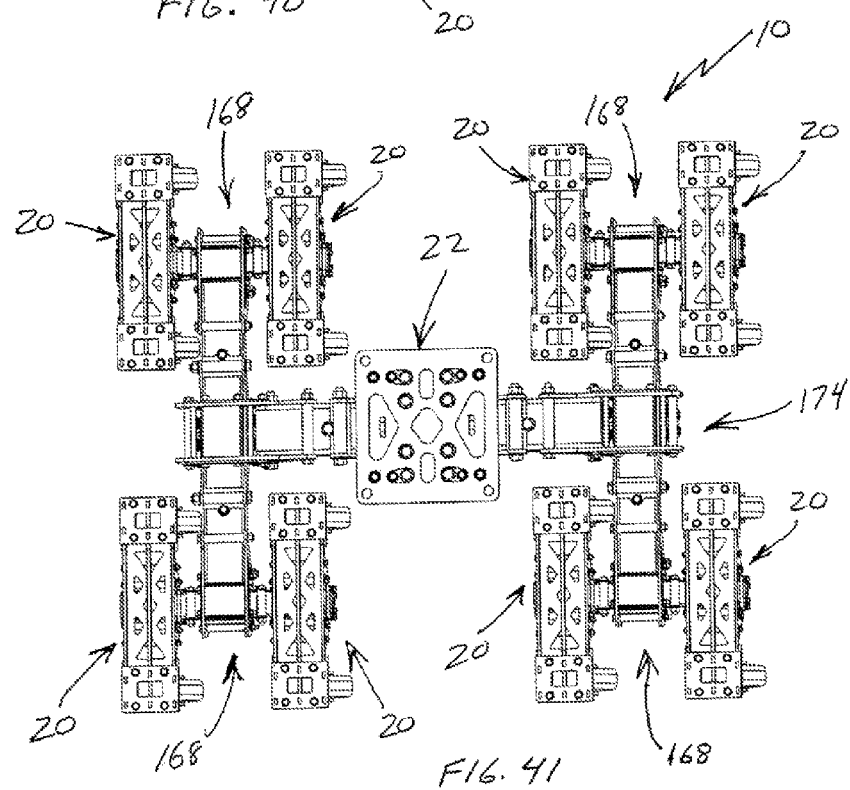
FIG. 41 is a top view of the articulating carriage of FIG. 40.

The embodiment of FIGS. 36 and 37 show use of four walking beam assemblies 20 to support an object 12 above the pedestal 22. In addition to the crosstube assembly 138 that is utilized to connect two adjacent walking beam assemblies 20 together, this embodiment includes a major crosstube assembly 168 that connects the two pairs of walking beam assemblies 20 together. The major crosstube assembly 168 comprises a stand plate assembly 170 that is utilized to prevent stress points on the tube that joins the pairs together and to allow individual walking beam assemblies 20 to pivot. A preferred configuration for a major crosstube assembly 168 is shown in FIGS. 38 and 39. The center brace 172 of the stand plate assembly 170 bears the weight and distributes across the tube. In a preferred embodiment, stand plate assembly 170 utilizes a bridge support and tie in the yoke assembly 140 to bolster the strength in order to support the increased weight of a larger and heavier object 12. The embodiment of FIGS. 40 and 41 show use of eight walking beam assemblies 20 to support an object 12 above pedestal 22 (shown with a slightly modified major crosstube assembly 168). In addition to the crosstube assembly 138 that connects two adjacent walking beam assemblies 20 together and the major crosstube assembly 168 which connects pairs of walking beam assemblies 20 together, the embodiment of FIGS. 40 and 41 comprise a compound crosstube assembly 174 that connects sets of multiple walking beam assemblies 20 that were formed by the major crosstube assemblies 168. Articulation takes place at all of the previously described connections, which results in an ever increasing ability to distribute weight and reduce mobile resistance.

As set forth above, the articulating carriage 10 of the present invention is very versatile with regard to the configuration that may be necessary to move very large and heavy objects 12. Because the articulating carriage 10 does not require any machining, welding, bending or fitting of parts the user can easily and inexpensively put together the articulating carriage 10 using only bolts and without the need for highly skilled labor. The components can be made out of steel and laser cut or drilled to the desired size and configuration. Articulating carriage 10 is configured such that the center of the wheels 38 remain between the outside edges of the outer fulcrums 102/104 at all times. This keeps the articulating carriage 10 from shifting as it takes up play and makes it stronger, smoother and quieter. The articulating carriage has a low driving moment that directs inertial forces up and over non-planar areas 16. This greatly reduces mobile resistence compared to conventional casters that direct inertial forces down and into the obstacle, which results in an undesirable increase in resistance to movement.

Articulating carriage 10 can be fitted with a braking mechanism, such as one that engages the surface 14 to prevent movement of the articulating carriage 10.

Although there is shown and described herein a specific form of the invention, it will be readily apparent to individuals skilled in the art that the present invention is not so limited, but is susceptible to numerous modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. An articulating carriage for moving an object across a surface, said articulating carriage comprising:
 a walking beam assembly having a base plate, a first caster assembly at a first end of said walking beam assembly, a second caster assembly at a second end of said walking beam assembly, a first hanger supported by said base plate and a second hanger supported by said base plate in spaced apart relation to said first hanger, each of said first caster assembly and said second caster assembly having a wheel configured to rotate about a wheel center and rotatably engage said surface and support said base plate above said surface, each of said first hanger and said second hanger having one or more articulation openings therein that are disposed in corresponding relation to each other below said base plate;
 a pedestal supported above said surface by said walking beam assembly, said pedestal having a first support plate at said first hanger, a second support plate at said second hanger in spaced apart relation to said first support plate and a mounting plate interconnecting said first support plate and said second support plate so as to dispose a support surface above said base plate and support said object above said walking beam assembly; and
 a pivoting means interconnecting said walking beam assembly and said pedestal for pivoting said walking beam assembly relative to said pedestal when at least one of said wheels contacts a non-planar area on said surface, said pivoting means comprising at least one bushing assembly positioned at a lower end of each of said first hanger and said second hanger below said base plate, a first fulcrum plate at said first support plate of said pedestal, a second fulcrum plate at said second support plate of said pedestal, a contact surface on each of said first fulcrum plate and said second fulcrum plate and one or more pivot members interconnecting said first fulcrum plate and said second fulcrum plate, said contact surface of said first fulcrum plate disposed in pivoting relation to said bushing assembly on said first hanger and said contact surface of said second fulcrum plate disposed in pivoting relation to said bushing assembly on said second hanger, at least one of said pivot members configured to move within at least one of said articulation openings in response to pivoting of said walking beam assembly.

2. The articulating carriage of claim 1, wherein said wheel center of each of said wheels is disposed between said first fulcrum plate and said second fulcrum plate.

3. The articulating carriage of claim 1, wherein said walking beam assembly further comprises means for securing each of said first hanger and said second hanger to said base plate.

4. The articulating carriage of claim 3, wherein said securing means clamps each of said first hanger and said second hanger to said base plate.

5. The articulating carriage of claim 1 further comprising pivot limiting means interconnecting said walking beam assembly and said pedestal for limiting the pivotal movement of said walking beam assembly.

6. The articulating carriage of claim 5, wherein said pivot limiting means comprises a forward edge and a rearward edge of said articulation opening.

7. The articulating carriage of claim 1, wherein said one or more pivot members comprises a crosstube, said articulation opening and said crosstube cooperatively configured with said crosstube received through said articulation opening and to allow pivotal movement of said walking beam assembly.

8. The articulating carriage of claim 1, wherein each of said bushing assemblies comprises a replaceable bushing.

9. The articulating carriage of claim 8, wherein said replaceable bushing is removably received in a bushing holder.

10. The articulating carriage of claim 1, wherein said contact surface of each of said first fulcrum plate and said second fulcrum plate pivotally engages said bushing assembly below a horizontal plane disposed through said wheel center of each of said wheels when said articulating carriage moves across the surface and said surface is substantially planar.

11. An articulating carriage for moving an object across a surface, said articulating carriage comprising:
 a walking beam assembly having a base plate, a first caster assembly at a first end of said walking beam assembly, a second caster assembly at a second end of said walking beam assembly, a pair of spaced apart hangers each having outwardly extending tangs engagedly supported by said base plate at each of said first end and said second end and a clamping plate at each of said first end and said second end for clamping said hangers to said base plate, each of said first caster assembly and said second caster assembly comprising at least one wheel configured to rotate about a wheel center and to rotatably engage said surface and support said base plate above said surface, each of said first hanger and said second hanger having one or more articulation openings below said base plate;
 a pedestal supported above said surface by said walking beam assembly, said pedestal having a first support plate at said first hanger, a second support plate at said second hanger in spaced apart relation to said first support plate and a mounting plate interconnecting said first support plate and said second support plate so as to dispose a support surface above said base plate and support said object above said walking beam assembly; and
 a pivoting means interconnecting said walking beam assembly and said pedestal for pivoting said walking beam assembly relative to said pedestal when at least one of said wheels contacts a non-planar area on said surface, said pivoting means comprising a first inner fulcrum plate and a first outer fulcrum plate at said first support plate, a second inner fulcrum plate and a second outer fulcrum plate at said second support plate, a contact surface on each of said fulcrum plates, a pair of bushing assemblies mounted at a lower end of each of said hangers and a pivot member interconnecting each of said fulcrum plates and said support plates, said contact surface of each of said fulcrum plates disposed in pivoting relation to one of said bushing assemblies below a horizontal plane disposed through said wheel center of each of said wheels when said articulating carriage moves across the surface and said surface is substantially planar, said pivot member configured to move within at least one of said articulation openings in response to pivoting of said walking beam assembly.

12. The articulating carriage of claim 11, wherein each of said bushing assemblies comprises a replaceable bushing.

13. The articulating carriage of claim 11, wherein said wheel center of each of said wheels is disposed between said first outer fulcrum plate and said second outer fulcrum plate.

14. The articulating carriage of claim 11 further comprising pivot limiting means interconnecting said walking beam assembly and said pedestal for limiting the pivotal movement of said walking beam assembly.

15. The articulating carriage of claim 14, wherein said pivot limiting means comprises a forward edge and a rearward edge of said articulation opening.

16. The articulating carriage of claim 11, wherein said one or more pivot members comprises a crosstube, said articulation opening and said crosstube cooperatively configured with said crosstube received through said articulation opening and to allow pivotal movement of said walking beam assembly.

17. An articulating carriage for moving an object across a surface, said articulating carriage comprising:
a first walking beam assembly having a base plate, a first caster assembly at a first end of said first walking beam assembly, a second caster assembly at a second end of said first walking beam assembly, a first hanger supported by said base plate and a second hanger supported by said base plate in spaced apart relation to said first hanger, each of said first caster assembly and said second caster assembly having a wheel configured to rotate about a wheel center and rotatably engage said surface and support said base plate above said surface, said wheel center disposed between said first hanger and said second hanger, each of said first hanger and said second hanger having one or more articulation openings therein that are disposed in corresponding relation to each other below said base plate;
a second walking beam assembly in spaced apart relation to said first walking beam assembly, second walking beam assembly having a base plate, a first caster assembly at a first end of said second walking beam assembly, a second caster assembly at a second end of said second walking beam assembly, a first hanger supported by said base plate and a second hanger supported by said base plate in spaced apart relation to said first hanger, each of said first caster assembly and said second caster assembly having a wheel configured to rotate about a wheel center and rotatably engage said surface and support said base plate above said surface, each of said wheel centers of said wheels disposed between said first hanger and said second hanger, each of said first hanger and said second hanger having one or more articulation openings therein that are disposed in corresponding relation to each other below said base plate;
an elongated crosstube interconnecting said articulation openings of said first walking beam assembly and said articulation openings of said second walking beam assembly;
a fulcrum assembly at each of said first walking beam assembly and said second walking beam assembly configured to allow said first end of said first walking beam assembly and said second walking beam assembly to pivot relative to said second end of said respective first walking beam assembly or said second walking beam assembly when one of said wheels contacts a non-planar area on said surface, each of said fulcrum assemblies having a first inner fulcrum plate and a first outer fulcrum plate at said first hanger, a second inner fulcrum plate and a second outer fulcrum plate at said second hanger, a contact surface on each of said fulcrum plates and a pair of bushing assemblies mounted at a lower end of each of said hangers, said fulcrum plates of each of said fulcrum assemblies receiving an end of said crosstube in said articulation openings of said hangers, said contact surface of each of said fulcrum plates disposed in pivoting relation to one of said bushing assemblies below a horizontal plane disposed through said wheel center of each of said wheels when said articulating carriage moves across the surface and said surface is substantially planar, each of said fulcrum assemblies and said articulation openings configured to allow said respective walking beam assembly to pivot relative to said crosstube;
a pedestal supported above said surface by said crosstube between said first walking beam assembly and said second walking beam assembly, said pedestal having a pair of spaced apart first support plates, a pair of spaced apart second support plates and a mounting plate interconnecting said support plates so as to dispose a support surface above said base plates of each of said first walking beam assembly and said second walking beam assembly to support said object above said walking beam assemblies; and
a yoke assembly interconnecting said crosstube and said pedestal for pivoting said crosstube relative to said pedestal when at least one of said wheels of said first walking beam assembly and said second walking beam assembly contacts said non-planar area on said surface to pivot said walking beam assembly relative to said pedestal.

18. The articulating carriage of claim 17 further comprising pivot limiting means interconnecting each of said walking beam assemblies and said crosstube for limiting the pivotal movement of said first walking beam assembly and said second walking beam assembly, said pivot limiting means comprising a forward edge and a rearward edge of each of said articulation openings of said hangers.

19. The articulating carriage of claim 17 further comprising a pair of said articulating carriages each having said first walking beam assembly and said second walking beam assembly interconnected by said crosstube with a major crosstube assembly interconnecting said crosstubes of each of said articulating carriages, said pedestal and said yoke assembly mounted on said major crosstube assembly between said pairs of said articulating carriages.

20. The articulating carriage of claim 19, wherein said articulating carriage comprises two pairs of articulating carriages each having said first walking beam assembly and said second walking beam assembly connected by said crosstube with said major crosstube assembly interconnecting said crosstubes to define each of said articulating carriages as having four walking beam assemblies, said articulating carriage further comprising a compound crosstube assembly interconnecting said major crosstube assemblies, said pedestal and said yoke assembly mounted on said compound crosstube assembly between said pairs of said articulating carriages.

* * * * *